(12) United States Patent
Park et al.

(10) Patent No.: US 10,963,211 B2
(45) Date of Patent: Mar. 30, 2021

(54) ELECTRONIC DEVICE AND METHOD FOR CONTROLLING AUDIO PATH THEREOF

(71) Applicant: Samsung Electronics Co., Ltd., Gyeonggi-do (KR)

(72) Inventors: Jinyoung Park, Gyeonggi-do (KR); Chan-Yong Jung, Gyeonggi-do (KR); Ga-Jin Song, Gyeonggi-do (KR); Dong-Ho Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 15/938,005

(22) Filed: Mar. 28, 2018

(65) Prior Publication Data
US 2018/0285061 A1    Oct. 4, 2018

(30) Foreign Application Priority Data

Mar. 28, 2017 (KR) .................. 10-2017-0039527

(51) Int. Cl.
*G06F 17/00* (2019.01)
*G06F 3/16* (2006.01)
(Continued)

(52) U.S. Cl.
CPC ............ *G06F 3/165* (2013.01); *G06F 3/0482* (2013.01); *G06F 3/0484* (2013.01);
(Continued)

(58) Field of Classification Search
CPC .............................. G06F 3/0484; G06F 3/165
(Continued)

(56) References Cited

U.S. PATENT DOCUMENTS 8,779,265 B1 * 7/2014 Gottlieb .............. G10H 1/0033
84/600
8,918,822 B2 * 12/2014 Varoglu ............. H04N 21/4333
725/93
(Continued)

FOREIGN PATENT DOCUMENTS

KR    20-2008-0005336 U    11/2008
KR        10-1277657 B1    6/2013
(Continued)

*Primary Examiner* — Stephen S Hong
*Assistant Examiner* — Matthew J Ludwig
(74) *Attorney, Agent, or Firm* — Cha & Reiter, LLC.

(57) ABSTRACT

Various embodiments of the present disclosure relate to an electronic device. The electronic device includes a housing, a touch screen display disposed on a surface of the housing, at least one wireless or wired communication circuit located inside the housing, a speaker exposed through the housing, at least one processor positioned inside the housing and operatively connected to the display, the communication circuit, and the speaker and a memory positioned inside the housing and operatively connected to the processor, wherein the memory stores instructions that, when executed, cause the at least one processor to detect that the electronic device is communicating with an external display device through the communication circuit, provide first data for rendering a first user interface on the external display device through the communication circuit responsive detecting that the electronic device is communicating with the external display device, determine whether the external display device can output audio data, in response that the external device can output audio data, provide second data configured to render a second user interface on the external display device through the communication circuit, wherein the second user interface allows a user to select one of the electronic device and the external display device for providing audio generated from or relayed through the electronic device, receive (Continued)

a selection of one of the electronic device and the external display device through the communication circuit or the touch screen display, and adapt an audio output path of the electronic device to provide the audio on the basis of the selection responsive to receiving the selection.

20 Claims, 22 Drawing Sheets

(51) Int. Cl.
    *G06F 3/0481*         (2013.01)
    *G06F 3/0484*         (2013.01)
    *G06F 3/0482*         (2013.01)
    *G06F 3/0488*         (2013.01)
    *G06F 3/14*         (2006.01)

(52) U.S. Cl.
    CPC ........ *G06F 3/0488* (2013.01); *G06F 3/04817* (2013.01); *G06F 3/1454* (2013.01); *G06F 3/1423* (2013.01); *G09G 2370/16* (2013.01)

(58) Field of Classification Search
    USPC .......................... 715/201, 202, 727, 203, 716
    See application file for complete search history.

(56) References Cited

U.S. PATENT DOCUMENTS

| | | | | |
|---|---|---|---|---|
| 9,756,436 | B2* | 9/2017 | Park | H04R 27/00 |
| 9,998,878 | B2* | 6/2018 | Schmit | H04W 76/10 |
| 2011/0321096 | A1* | 12/2011 | Landow | H04N 21/4621 |
| | | | | 725/41 |
| 2012/0246374 | A1* | 9/2012 | Fino | G06F 1/1632 |
| | | | | 710/303 |
| 2013/0326092 | A1* | 12/2013 | Kang | G06F 13/102 |
| | | | | 710/8 |
| 2014/0294194 | A1 | 10/2014 | Park et al. | |
| 2014/0365970 | A1* | 12/2014 | Jeong | G06F 3/04817 |
| | | | | 715/835 |
| 2016/0085713 | A1* | 3/2016 | Glik | G06F 13/4081 |
| | | | | 710/304 |

FOREIGN PATENT DOCUMENTS

| | | |
|---|---|---|
| KR | 10-2014-0119916 A | 10/2014 |
| KR | 10-2016-0073208 A | 6/2016 |

* cited by examiner

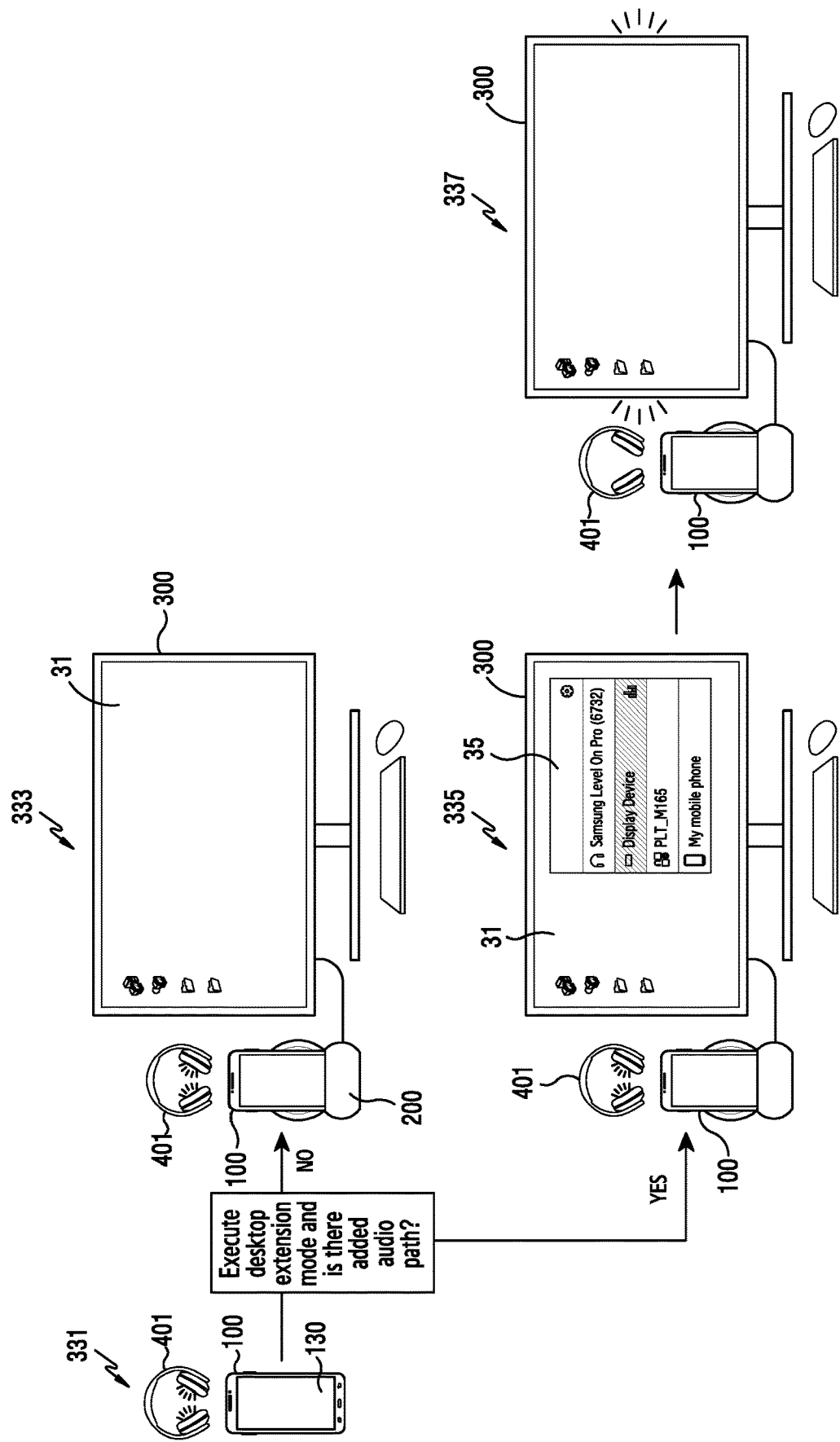

ELECTRONIC DEVICE AND METHOD FOR CONTROLLING AUDIO PATH THEREOF

CROSS-REFERENCE TO RELATED APPLICATION(S)

This application is based on and claims priority under 35 U.S.C. § 119 to Korean Patent Application No. 10-2017-0039527, filed on Mar. 28, 2017, in the Korean Intellectual Property Office, the disclosure of which is incorporated by reference herein in its entirety.

BACKGROUND

1) Field

The present disclosure relates to an electronic device and a method of controlling an audio path thereof.

2) Description of Related Art

Electronic devices (e.g., mobile terminals, smart phones, wearable devices, etc.) can provide a variety of functions. For example, in addition to basic voice communication functions, a smart phone can provide a short range wireless communication (e.g., Bluetooth, Wi-Fi, or near field communication (NFC)), a mobile communication (3G, 4G, 5G, etc.) function, a music or video reproduction function, an image capturing function, a navigation function, and the like.

When a device is used with other devices, the sound output can be interrupted. This is inconvenient for users. Further limitations and disadvantages of conventional and traditional approaches will become apparent, through comparison of such systems with embodiments of the present disclosure as set forth in the remainder of the present application with reference to the drawings.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to provide an electronic device which may allow a user to select an audio path when the electronic device is connected to at least one external device, and a method of controlling an audio path thereof.

Another aspect of the present disclosure is to provide a user interface in which an electronic device may maintain an audio output through a default (or pre-connected) audio path when connected to an external device during the audio output or when the audio output is requested while the electronic device is connected to the external device and may select an audio path.

Still another aspect of the present disclosure is to provide a user interface in which an electronic device may output audio through a default path when a desktop extension mode is executed during the reproduction of video or audio contents or when the reproduction of a video or audio content is requested during the execution of the desktop extension mode and may select an audio path.

In accordance with an aspect of the present disclosure, an electronic device includes: a housing; a touch screen display disposed on a surface of the housing; at least one wireless or wired communication circuit located inside the housing; a speaker exposed through the housing; at least one processor positioned inside the housing and operatively connected to the display, the communication circuit, and the speaker; and a memory positioned inside the housing and operatively connected to the processor, wherein the memory stores instructions that, when executed, cause the at least one processor to: detect that the electronic device is communicating with an external display device through the communication circuit, provide first data for rendering a first user interface on the external display device through the communication circuit responsive to detecting that the electronic device is communicating with the external display device, determine whether the external display device can output audio data, when the external device can output audio data, provide second data configured to render a second user interface on the external display device through the communication circuit, wherein the second user interface allows a user to select one of the electronic device and the external display device for providing audio generated from or relayed through the electronic device, receive a selection of one of the electronic device and the external display device through the communication circuit or the touch screen display, and responsive to receiving the selection adapt an audio output path of the electronic device to provide the audio on the basis of the selection.

In accordance with another aspect of the present disclosure, a method of controlling an audio output path of an electronic device, includes: detecting that the electronic device is communicating with an external display device through a communication circuit; providing first data for rendering a first user interface on the external display device through the communication circuit responsive to detecting that the electronic device is communicating with the external display device; providing second data configured to render a second user interface on the external display device through the communication circuit, wherein the second user interface allows a user to select one of the electronic device and the external display device for providing audio generated from or relayed through the electronic device; receiving a selection of one of the electronic device and the external display device through the communication circuit or a touch screen display included in the electronic device; and responsive to receiving the selection, adapting the audio output path of the electronic device to provide the audio on the basis of selection.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3D is a diagram illustrating an example of providing a user interface capable of changing an audio output path during the reproduction of audio in an electronic device according to an embodiment of the present disclosure;

DETAILED DESCRIPTION

Figure 1A:
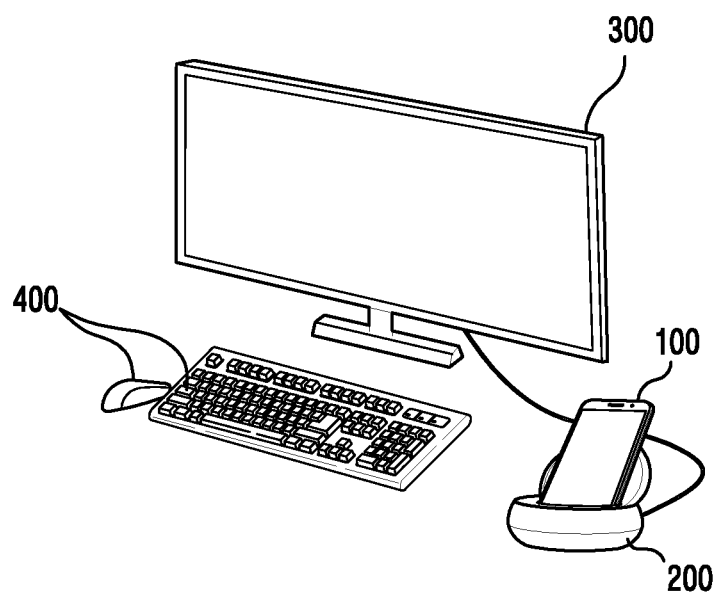
FIG. 1A and FIG. 1B illustrate a docking system according to an embodiment of the present disclosure.

Certain embodiments of the present disclosure are described in greater detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" also include plural referents unless the context clearly dictates otherwise. In the present disclosure, an expression such as "A or B," "at least one of A and B" or "one or more of A and B" may include all possible combinations of the listed items. Expressions such as "first," "second," "primarily," or "secondary," as used herein, may represent various elements regardless of order and/or importance, and do not limit the corresponding elements. The expressions may be used for distinguishing one element from another element. When it is described that an element (such as a first element) is operatively or communicatively "coupled to" or "connected to" another element (such as a second element), the element may be directly connected to the other element or may be connected through another element (such as a third element). "Connected to" shall also include in wireless communication over a radio channel.

The expression "configured (or set) to", as used in the present disclosure, may be used interchangeably with, for example, "suitable for," "having the capacity to," "designed to," "adapted to," "made to," or "capable of", according to the situation. The term "configured (or set) to" does not only refer to "specifically designed to" in hardware. Alternatively, in some situations, the expression "apparatus configured to" may refer to a situation in which the apparatus "may" operate together with another apparatus or component. The phrase "a processor configured (or set) to perform A, B, and C" may be a dedicated processor, a general-purpose processor (such as a central processing (CPU) or an application processor (AP)) that may perform a corresponding operation by executing at least one software program stored in a dedicated processor (such as an embedded processor) for performing a corresponding operation or in a memory device.

An electronic device, according to an embodiment of the present disclosure, may be for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, and the like, but is not limited thereto. The wearable device may include at least one of an accessory type (e.g., a watch, a ring, a bracelet, an ankle bracelet, a necklace, eyeglasses, a contact lens, or a head-mounted-device (HMD)), a fabric or clothing embedded type (e.g., electronic garments), a body attachable type (e.g., a skin pad or a tattoo), and an implantable circuit, and the like, but is not limited thereto. The electronic device may be at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame, and the like, but is not limited thereto.

In an embodiment of the present disclosure, the electronic device may be at least one of various medical devices (such as, various portable medical measuring devices (a blood sugar level measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for a ship (such as, a navigation device for a ship and a gyro compass), avionics, a security device, a head unit for a vehicle, an industrial or home robot, a drone, an automated teller machine (ATM), a point of sales (POS) device, and an Internet of things (IoT) device (e.g., a light bulb, various sensors, a sprinkler device, a fire alarm, a thermostat, a street light, a toaster, sports equipment, a hot water tank, a heater, and a boiler), and the like, but is not limited thereto.

According to an embodiment of the present disclosure, the electronic device may be at least one of a portion of furniture, building/construction or vehicle, an electronic board, an electronic signature receiving device, a projector, and various measuring devices (e.g., water supply, electricity, gas, or electric wave measuring device), and the like, but is not limited thereto. An electronic device may be a flexible electronic device or a combination of two or more of the foregoing various devices. An electronic device is not limited to the foregoing devices, and may be embodied as a newly developed electronic device. The term "user", as used herein, may refer to a person using an electronic device or a device using an electronic device (e.g., an artificial intelligence electronic device). The electronic device may be connected to various external devices via (or directly) a docking device. For example, the electronic device may be connected to a television (TV), a monitor, an earphone, a Bluetooth headset, or the like. The electronic device may output audio and/or video through one of the connected external devices.

Figure 1B:
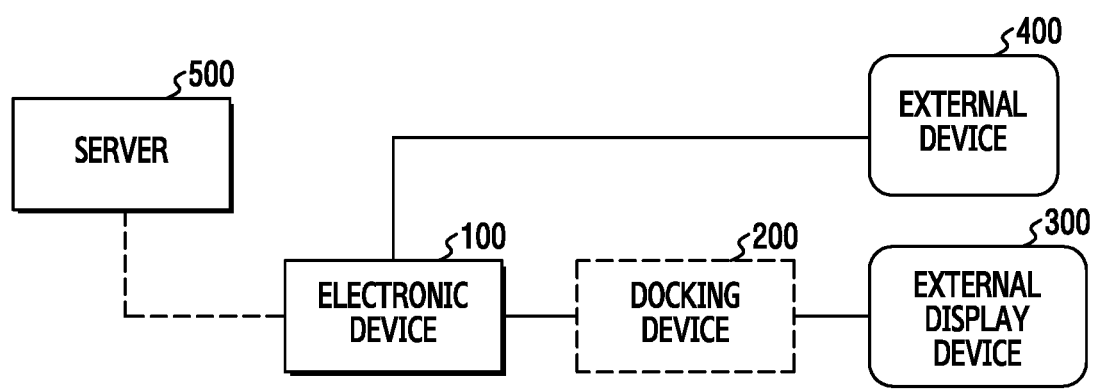

FIGS. 1A and 1B illustrate a docking system according to an embodiment of the present disclosure.

Referring to FIGS. 1A and 1B, a docking system according to an embodiment of the present disclosure may include an electronic device 100, a docking device 200, an external display device 300, an external device 400, and a server 500.

The electronic device 100 may be a smart phone, a wearable device, or a tablet PC which supports a desktop extension mode. The desktop extension mode is a mode in which the electronic device 100, the docking device 200, the external display device 300, and the external device 400 are connected to provide a usage environment similar to a general personal computer. For example, the electronic device 100 may serve as a main body (or what is sometimes referred to as the "cabinet") in a personal computer environment, the external display device 300 may serve as a monitor, and the external device 400 may serve as a keyboard and a mouse. Thus, the electronic device 100 provides the processing and memory, while external display device 300 and external device 400 provide the input/output.

When the electronic device 100 is docked with the docking device 200, the electronic device 100 may be executed in the desktop extension mode. The electronic device 100 may provide a user interface similar to a window (Windows™) OS to the external display device 300 when the desktop extension mode is executed. The electronic device 100 may receive a user input through the external device 400.

In certain embodiments, the electronic device 100 can be configured to detect docking with the docking device 200 and automatically enter the desktop extension mode in response to detecting docking.

The docking device 200 may be a device for docking the electronic device 100. The docking device 200 may be connected to various external devices through wired communication and/or wireless communication. For example, the docking device 200 may be connected to the external display device 300. Although not shown in FIGS. 1A and 1B, the docking device 200 may be connected to a charger, a wired LAN, a universal serial bus (USB) device, or the like.

The external display device 300 may display an image. For example, the external display device 300 may be a monitor, a television, or the like. The external display device 300 may receive and output images from the electronic device 100 through the docking device 200, or may receive and output images and audio. Here, the external display device 300 may be connected to the docking device 200 via a wired manner (e.g., a high definition multimedia interface (HDMI), a display port (DP), or a universal serial bus (USB) type-C) or a wireless manner.

The external device 400 may include a mouse and/or a keyboard. The external device 400 may be connected to the electronic device 100 in a wired or wireless manner, or may be connected to the docking device 200 in a wired or wireless manner. The external device 400 may include a Bluetooth headset, a Bluetooth earphone, a wired earphone, or a sound device.

The server 500 may manage a policy associated with the electronic device 100. For example, the server 500 may manage a third party application (app) that can be installed in the electronic device 100 and compatibility information of the desktop extension mode. The compatibility information may be transmitted to the electronic device 100 upon execution of the desktop extension mode, upon a user request, or periodically, and may be updated.

According to some embodiments, the electronic device 100 may be directly connected to the external display device 300. For example, the electronic device 100 may be directly connected to the external display device 300 via a wired communication circuit or a wireless communication circuit.

The electronic device 100 may be connected to the external display device 300 to output video and/or audio reproduced in the electronic device. For example, when a user launches a video player application to watch a movie, the video can be displayed on the external display device 300, and the audio can be outputted via the electronic device 100 until it is determined that the audio can be outputted via the external display device 300. The electronic device 100 does not change an audio path to output audio through external devices regardless of whether the external devices include a speaker (or is connected to a speaker). Thus, the present disclosure can prevent interruption of sound by establishing an audio path that may avoid external devices without speakers.

Figure 2:
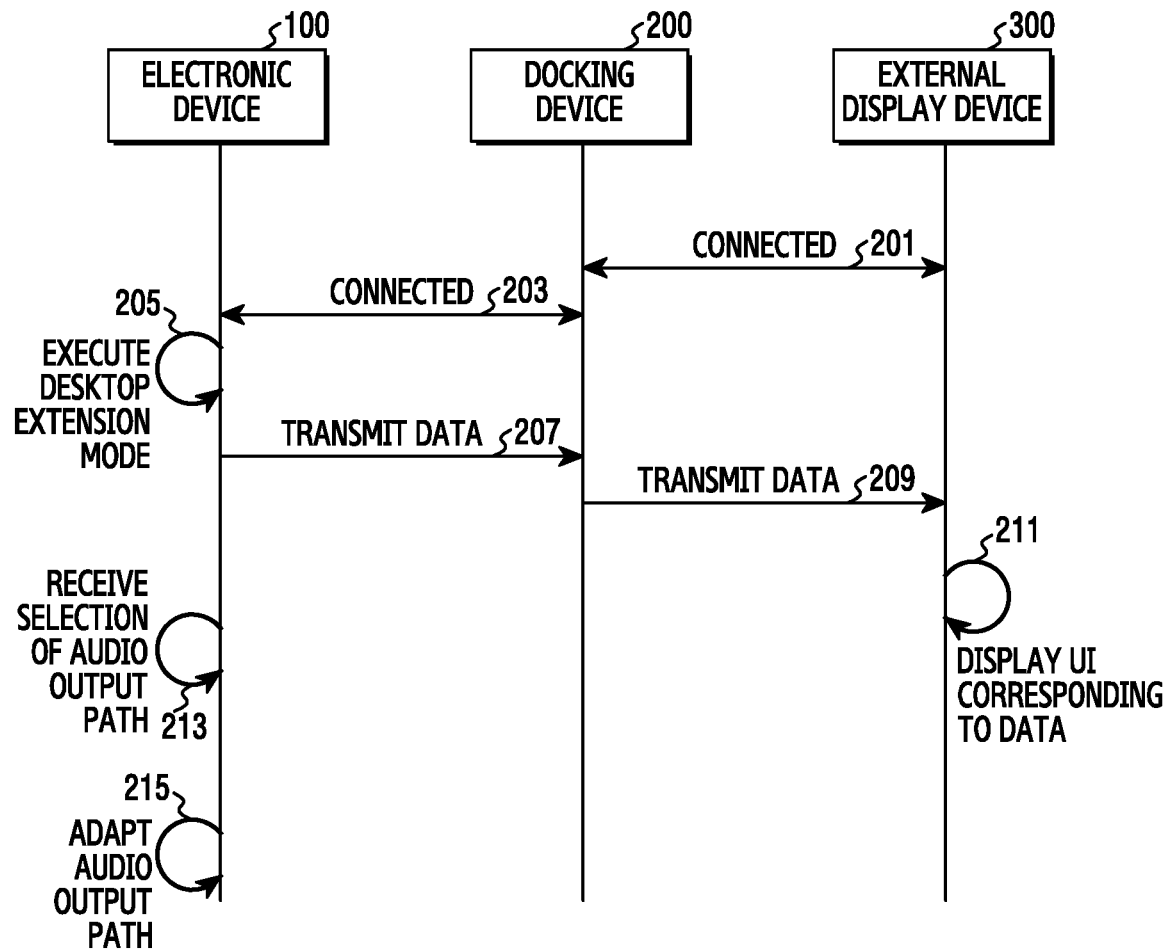
FIG. 2 is a flowchart illustrating a procedure for controlling an audio output path of a docking system according to an embodiment of the present disclosure.

FIG. 2 is a flowchart illustrating a procedure for controlling an audio output path of a docking system according to an embodiment of the present disclosure.

Referring to FIG. 2, in operation 201, the docking device 200 according to an embodiment of the present disclosure and the external display device 300 may be connected to each other. For example, the docking device 200 and the external display device 300 may be connected to each other through a wired cable (e.g., HDMI, DP, or USB type-C) capable of transmitting video and/or audio signals. According to some embodiments, the docking device 200 and the external display device 300 may be wirelessly connected to each other.

In operation 203, the electronic device 100 according to an embodiment of the present disclosure may be connected to the docking device 200. For example, when the electronic device 100 is mounted on the docking device 200, the electronic device 100 may be electrically connected to the docking device 200 through a USB type-C interface.

In operation 205, when connected to the docking device 200, the electronic device 100 according to an embodiment of the present disclosure may execute the desktop extension mode. In certain embodiments, the electronic device 100 can be configured to detect mounting on the docking device 200 and automatically enter the desktop extension mode.

According to some embodiments, the electronic device 100 and the docking device 200 are first connected to each other, and the docking device 200 may also be connected to the external display device 300. The electronic device 100 may execute the desktop extension mode when the external display device 300 is connected to the docking device 200.

In operation 207, when the desktop extension mode is executed, the electronic device 100 according to an embodiment of the present disclosure may transmit data to the docking device 200. The data may be data for executing a desktop extension mode, and may include first data configured to render a first user interface on the external display device 300. The first user interface may be a home screen (or wallpaper) in a desktop mode. According to some embodiments, the first user interface may include a home screen in a desktop mode and an application screen which is executed in the electronic device 100.

When the external display device 300 can perform an audio output (i.e., has a speaker), the data may further include second data for rendering a second user interface that allows a user to select one of the electronic device 100 or the external display device 300 for outputting audio generated from or relayed through the electronic device 100. According to some embodiments, when the electronic device 100 is connected to the external display device 300 through the docking device 200, the audio that is generated from the electronic device 100 or relayed through the electronic device 100 may be transmitted to the external display device 300 through the docking device 200. When the external display device 300 cannot perform audio output, the second data can be omitted.

The docking device 200 according to an embodiment of the present disclosure may transmit the received data to the external display device 300. Although operations 207 and 209 are separately shown and described in FIG. 2, this is for convenience of description. The docking device 200 only serves as an interface for connecting the electronic device 100 and the external display device 300, and might not perform the function of receiving data from the electronic device 100 and transmitting the received data to the external display device 300.

Although not shown, the electronic device 100 according to an embodiment of the present disclosure may confirm whether the docking device 200 and/or the external display device 300 are devices capable of outputting audio when the desktop extension mode is executed. According to some embodiments, the electronic device 100 may confirm whether the docking device 200 and/or other external devices connected to the external display device 300 are devices capable of outputting audio. For example, the electronic device 100 may be connected to the external display device 300 and the docking device 200, and may receive information on whether the docking device 200 and/or the external display device 300 are devices capable of outputting audio, from the docking device 200 and the external display device 300 before executing the desktop extension mode.

In certain embodiments, the electronic device 100 can include memory that stores the identity of any newly or first-time connected external display device 300 and information regarding the capabilities of the external display device 300. When the external display device 300 is later encountered, the electronic display device 100 can retrieve the capability information and determine whether the external display device 300 can output audio when the desktop extension mode is executed.

In operation 211, the external display device 300 according to an embodiment of the present disclosure may display a user interface corresponding to the received data. The user interface may include the first user interface corresponding to the home screen in the desktop extension mode and/or the second user interface capable of selecting an audio output path.

In operation 213, the electronic device 100 according to an embodiment of the present disclosure may receive a selection of a path through which audio is output. For example, the electronic device 100 may receive a user input (e.g., a mouse click or a touch input) that selects one of a plurality of audio output paths displayed on the second user interface.

In operation 215, the electronic device 100 according to an embodiment of the present disclosure may adapt the audio output path to provide audio on the basis of the selection.

The present disclosure avoids an audio path to a device that is not capable of outputting audio, as will be described below.

Figure 3A:
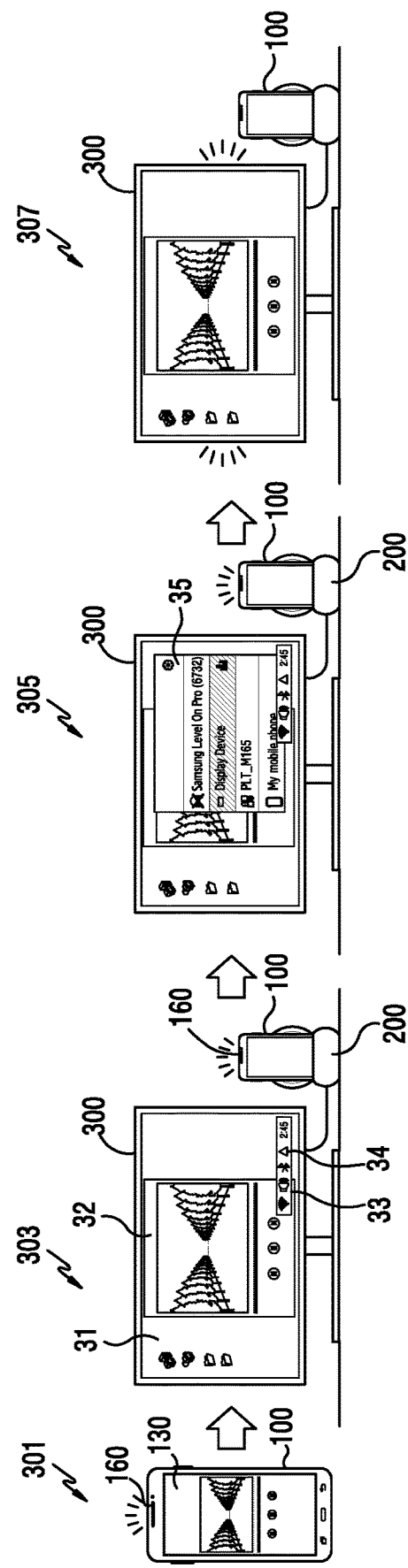
FIG. 3A is a diagram illustrating an example of providing a user interface capable of changing an audio output path in a desktop extension mode of an electronic device according to an embodiment of the present disclosure.

FIG. 3A is a diagram illustrating an example of providing a user interface capable of changing an audio output path in a desktop extension mode of an electronic device according to an embodiment of the present disclosure.

Referring to FIG. 3A, the electronic device 100 according to an embodiment of the present disclosure may reproduce a video through a first video reproducing application which is compatible with the desktop extension mode. Although the electronic device 100 is not presently operating in desktop extension mode, as shown in the drawing indicated by reference numeral 301. At this time, the electronic device 100 may output audio through a speaker 160 of the electronic device 100 and may output an image through a display 130 of the electronic device 100.

When the electronic device 100 is docked with the docking device 200 and connected to the external display device 300 during the reproduction of the video, the electronic device 100 may execute the desktop extension mode and may provide the first data to the external display device 300 so that a home screen 31 and a video reproduction screen 32 are displayed on the external display device 300, as shown in the drawing indicated by reference numeral 303. At this time, the electronic device 100 may maintain an audio output through the speaker 160. According to an embodiment, when the electronic device 100 executes the desktop extension mode, the display 130 of the electronic device 100 may be inactivated (e.g., dimmed, or backlight turned off).

A quick panel 33 may be displayed on one side (e.g., right lower end) of the home screen 31. The quick panel 33 may include a plurality of setting buttons. For example, the quick panel 33 may include a Wi-Fi setting button, a volume adapting button, a Bluetooth setting button, an audio path setting button 34, or a time setting menu. The selection of the audio path setting button 34 confirms that the external display device is capable of outputting audio data.

When the audio path setting button 34 is selected, the electronic device 100 may provide the second data to the external display device 300 so that a user interface 35 (hereinafter, referred to as "selection screen") capable of selecting an audio path is displayed on the external display device 300, as shown in the drawing indicated by reference numeral 305. The selection screen 35 may include a list of at least one device (e.g., at least one external device (e.g., a wired or wireless speaker) connected to at least one of the electronic device 100 and the external display device 300 or connected to at least one of the electronic device 100, the docking device 200, and the display device 300) capable of performing an audio output.

For example, the selection screen 35 can display a menu including the external display device 300 ("Display Device"), the docking device 200 ("PLT_M165), the electronic device 100 ("My mobile phone"), and another external device, such as a Bluetooth headset ("Samsung Level On Pro (6732)").

The selection screen 35 may display connection state information of at least one device. For example, an "X" mark on an icon of a Bluetooth earphone of the selection screen 35 in FIG. 3A may indicate that a Bluetooth headset is not connected (e.g., paired) to the electronic device 100. When the Bluetooth headset is connected to the electronic device 100, the "X" mark may be removed. The connection state may be indicated using various other methods (e.g., contrast, size, or shape).

According to some embodiments, only currently connected devices may be displayed. For example, when the Bluetooth headset is not connected to the electronic device 100, the list of the selection screen 35 may not include the Bluetooth headset.

When one device included in the list is selected, the electronic device 100 may adapt an audio output path so that audio is output through the selected device. For example, when the external display device 300 is selected on the selection screen 35, the electronic device 100 may adapt the audio path so that audio is output through the external display device 300 as shown in the drawing indicated by reference numeral 307. The user can dynamically chose the audio path by reselecting the button 34 and selecting another item from the menu.

Figure 3B:
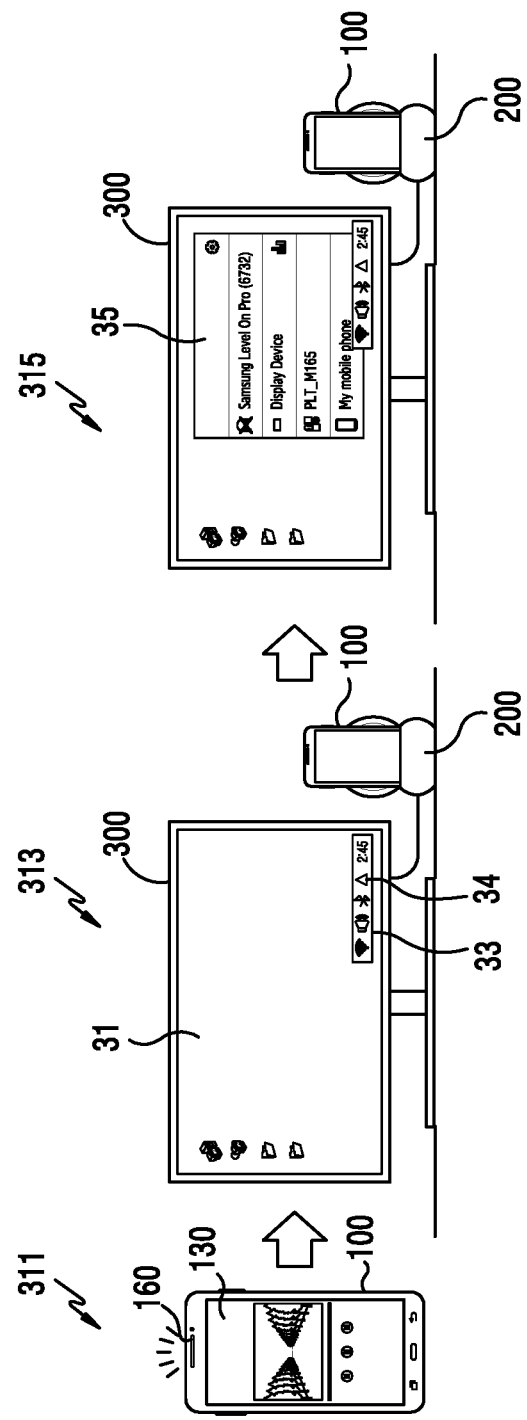
FIG. 3B is a diagram illustrating another example of providing a user interface capable of changing an audio output path in a desktop extension mode of an electronic device according to an embodiment of the present disclosure.

FIG. 3B is a diagram illustrating another example of providing a user interface capable of changing an audio output path in a desktop extension mode of an electronic device according to an embodiment of the present disclosure.

Referring to FIG. 3B, the electronic device 100 according to an embodiment of the present disclosure may reproduce a video through a second video reproducing application which is incompatible with the desktop extension mode, although the electronic device 100 is not presently in desktop extension mode, as shown in the drawing indicated by reference numeral 311. At this time, the electronic device 100 may output audio through the speaker 160 of the electronic device 100 and may output an image through the display 130 of the electronic device 100.

When the electronic device 100 is docked with the docking device 200 and connected to the external display device 300 during the reproduction of the video, the electronic device 100 may execute the desktop extension mode and may provide the first data to the external display device 300 so that the home screen 31 is displayed on the external display device 300, as shown in the drawing indicated by reference numeral 313. At this time, the electronic device 100 may terminate or stop the second video reproducing application because the second video reproducing application is not compatible with the desktop extension mode.

The quick panel 33 may be displayed on one side (e.g., right lower end) of the home screen 31. The quick panel 33 may include a plurality of setting buttons. For example, the quick panel 33 may include a Wi-Fi setting button, a volume adapting button, a Bluetooth setting button, an audio path setting button 34, or a time setting menu.

When the audio path setting button 34 is selected, the electronic device 100 may provide the second data to the external display device 300 so that the selection screen 35 capable of selecting an audio path is displayed on the external display device 300, as shown in the drawing indicated by reference numeral 315. The selection screen 35 may include a list of at least one device (e.g., at least one external device (e.g., a wired or wireless speaker) connected to at least one of the electronic device 100 and the external display device 300 or connected to at least one of the electronic device 100, the docking device 200, and the display device 300) capable of performing an audio output.

When one device included in the list is selected, the electronic device 100 may adapt an audio output path so that audio is output through the selected device.

According to an embodiment, when the second video reproducing application supports resizing, the electronic device 100 may reproduce the video by re-executing the second video reproducing application in the desktop extension mode. For example, when the video is reproduced by re-executing the second video reproducing application, audio may be output through the selected device.

According to another embodiment, the electronic device may reproduce the video through another video reproducing application which is compatible with the desktop extension mode.

According to some embodiments, when the execution of an application (e.g., a video reproducing application) which is incompatible with the desktop extension mode is requested in the desktop extension mode, the electronic device may provide a notification indicating that the corresponding application is incompatible (e.g., output a pop-up message on the external display device 300).

Figure 3C:
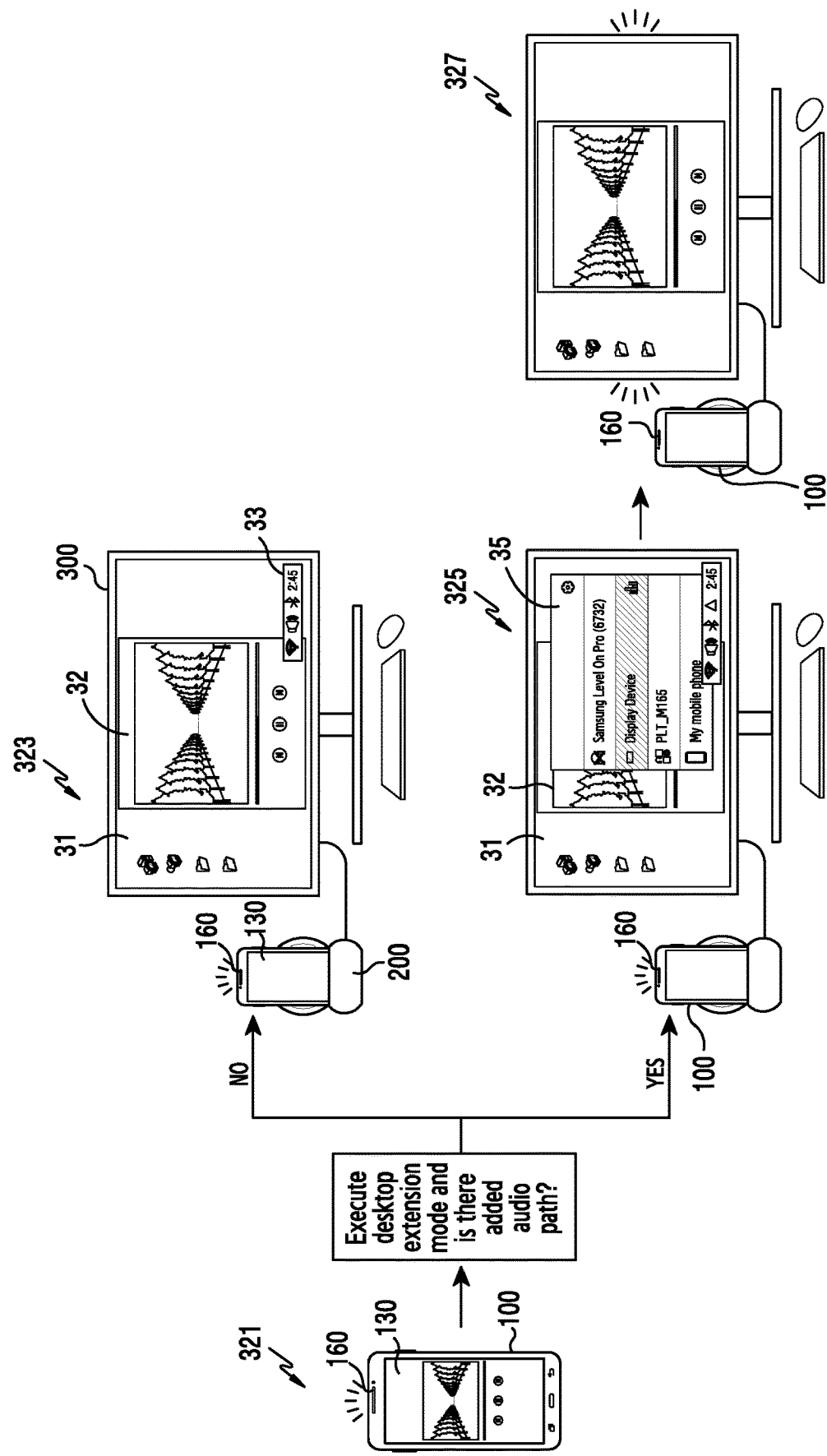
FIG. 3C is a diagram illustrating an example of providing a user interface capable of changing an audio output path during the reproduction of video in an electronic device according to an embodiment of the present disclosure.

FIG. 3C is a diagram illustrating an example of providing a user interface capable of changing an audio output path during the reproduction of video in an electronic device according to an embodiment of the present disclosure.

Referring to FIG. 3C, the electronic device 100 according to an embodiment of the present disclosure may reproduce a video through the first video reproducing application which is compatible with the desktop extension mode, although the electronic device 100 is not presently in desktop extension mode, as shown in the drawing indicated by reference numeral 321. At this time, the electronic device 100 may output audio through the speaker 160 and may output an image through the display 130.

When the electronic device 100 is docked with the docking device 200 connected to the external display device 300 or connected to the external display device 300 during the reproduction of the video, the electronic device 100 may execute the desktop extension mode and may determine whether a new audio output path exists. For example, the electronic device 100 may receive device information from the external display device 300 and/or the docking device 200 when the desktop extension mode is executed. For example, the device information may include information on the presence or absence of a device (e.g., a sound card) capable of reproducing audio. According to some embodiments, the device information may include information on whether a speaker is included in the external display device 300 and/or the docking device 200 or whether the speaker is connected thereto. According to some embodiments, the electronic device 100 may receive device information on the external display device 300 from the docking device 200.

When it is determined that the new audio output path does not exist, the electronic device 100 may provide only the first data, but not the second data, to the external display device 300 so that the home screen 31 and the video reproduction screen 32 are displayed on the external display device 300, as shown in the drawing indicated by reference numeral 323. In this case, since the new audio output path does not exist, the home screen 31 in the drawing of reference numeral 323 may display, on one side (e.g., right lower end) the quick panel 33 including the Wi-Fi setting button, the volume adapting button, the Bluetooth setting button, or the time setting menu except for the audio path setting button. The electronic device 100 may maintain the audio output through the speaker 160.

When it is determined that the new audio output path exists, the electronic device 100 may provide the first data to the external display device 300 so that the home screen 31 and the video reproduction screen 32 are displayed, and may provide the second data to the external display device 300 so that the selection screen 35 capable of selecting an audio path is displayed on the external display device 300, as shown in the drawing indicated by reference numeral 325. The selection screen 35 may include a list of devices capable of performing an audio output.

When the external display device 300 is selected on the selection screen 35, the electronic device 100 may control audio to be output through the speaker of the external display device 300 other than the speaker 160 of the electronic device 100, as shown in the drawing indicated by reference numeral 327.

FIG. 3D is a diagram illustrating an example of providing a user interface capable of changing an audio output path during the reproduction of audio in an electronic device according to an embodiment of the present disclosure.

Referring to FIG. 3D, the electronic device 100 according to an embodiment of the present disclosure may output audio through a Bluetooth headset 401 when an audio reproducing application is executed, as shown in the drawing indicated by reference numeral 331. Although not shown, the electronic device 100 may output an audio reproducing application screen on the display 130.

When the electronic device 100 is docked with the docking device 200 connected to the external display device 300 or connected to the external display device 300 during the reproduction of the audio content, the electronic device 100 may execute the desktop extension mode and may determine whether a new audio output path exists.

When it is determined that the new audio output path does not exist, the electronic device 100 may provide the first data to the external display device 300 so that the home screen 31 is displayed on the external display device 300 as shown in the drawing indicated by reference numeral 333. At this time, the electronic device 100 may maintain the audio output through the Bluetooth headset 401. According to a certain embodiments, the electronic device 100 may provide second data to the external display device 300 so that the selection screen capable of selecting an audio path (e.g., a menu that may change the audio path from the Bluetooth headset 401 to the electronic device 100) is displayed on the external display device 300.

When it is determined that the new audio output path exists, the electronic device 100 may provide the first data to the external display device 300 so that the home screen 31 is displayed and may provide the second data to the external display device 300 so that the selection screen 35 capable of selecting an audio path is displayed on the external display device 300, as shown in the drawing indicated by reference numeral 335. The selection screen 35 may include a list of devices capable of performing an audio output.

When the external display device 300 is selected on the selection screen 35, the electronic device 100 may control audio to be output through the speaker of the external display device 300 other than the Bluetooth headset 401, as shown in the drawing indicated by reference numeral 337.

Figure 3E:
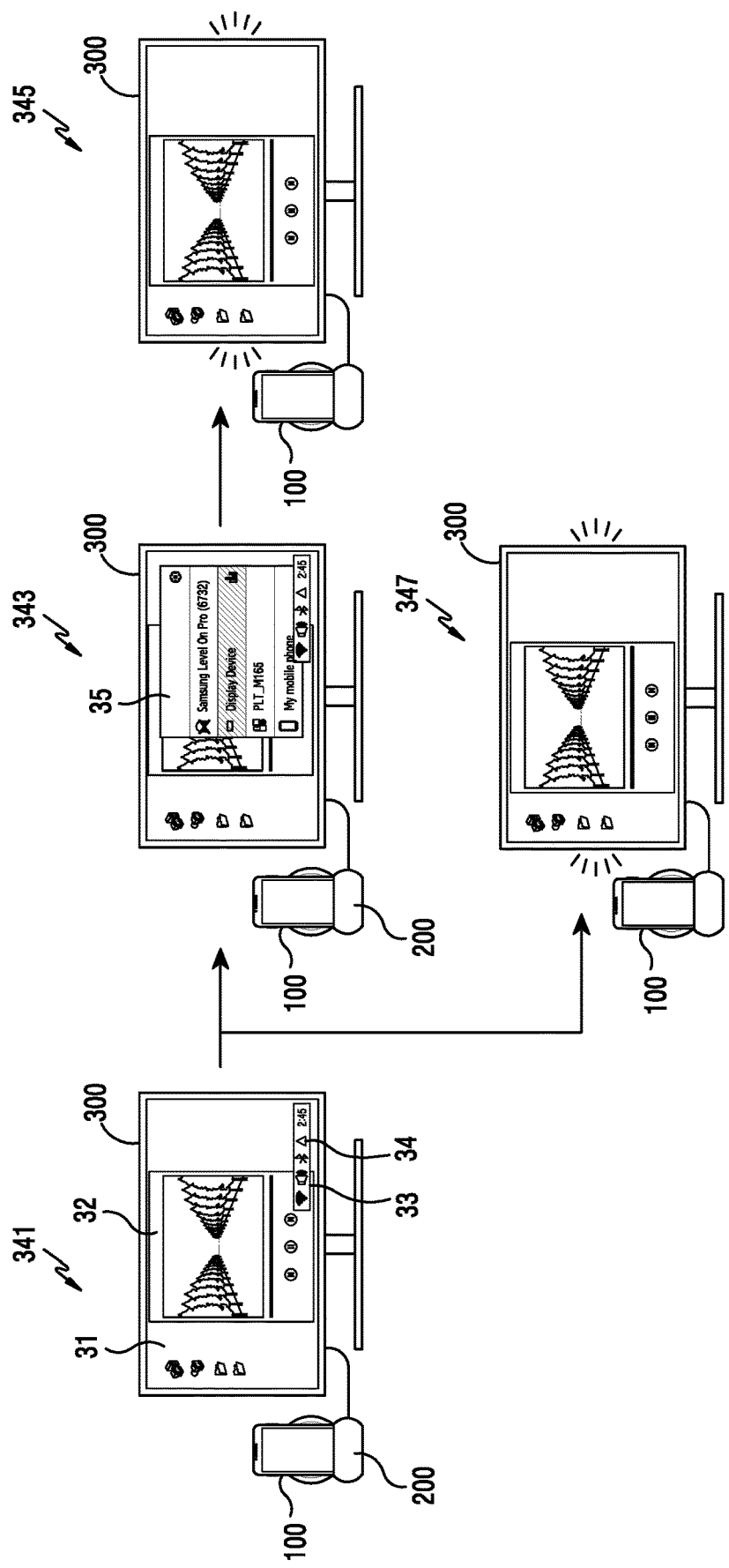
FIG. 3E is a diagram illustrating an example of controlling an audio path of an electronic device on the basis of an audio path change history according to an embodiment of the present disclosure.

FIG. 3E is a diagram illustrating an example of controlling an audio path of an electronic device on the basis of an audio path change history according to an embodiment of the present disclosure.

Referring to FIG. 3E, the electronic device 100 according to an embodiment of the present disclosure may detect an execution request for a video reproducing application while the desktop extension mode is executed, as shown in the drawing indicated by reference numeral 341.

In response to the request, the electronic device 100 may determine whether an audio path change history exists. For example, the electronic device 100 may determine whether there is a change history wherein audio is output through the external display device 300.

The electronic device 100 may store and manage connection information with an external device (e.g., the docking device 200 or the external display device 300) and the audio path change history. The change history can be detected in a number of ways. For example, the user may indicate a desire to change the audio path to external display device 300 via a user setting. Alternatively, during prior use, the electronic device 100 can record the history of the user choices upon docking, and detect a pattern of changing the audio output to the external electronic device 300.

When it is determined that the change history does not exist, the electronic device 100 may provide the second data to the external display device 300 so that the selection screen 35 capable of selecting an audio path is displayed on the external display device 300, as shown in the drawing indicated by reference numeral 343. The selection screen 35 may include a list of devices capable of performing an audio output. When the external display device 300 is selected on the selection screen 35, the electronic device 100 may control audio to be output through the speaker of the external display device 300 as shown in the drawing indicated by reference numeral 345.

According to an embodiment, the electronic device 100 may control the audio path to be automatically changed and output at the time of the audio output when the audio path change history exists. For example, as shown in the drawing indicated by reference numeral 341, the electronic device 100 receives an execution request for a video reproducing application. As shown in the drawing indicated by reference numeral 347, when the change history exists, the electronic device 100 may control the audio path so that audio is output through the speaker of the external display device 300. By way of another example, the electronic device 100 may receive the execution request for the video reproducing application as shown in the drawing indicated by reference numeral 341, and may control the audio path so that audio is output through the speaker of the external display device 300 as shown in the drawing indicated by reference numeral 347, without displaying the selection screen 35 capable of selecting the audio path when receiving an input for the audio path setting button 34.

Figure 4:
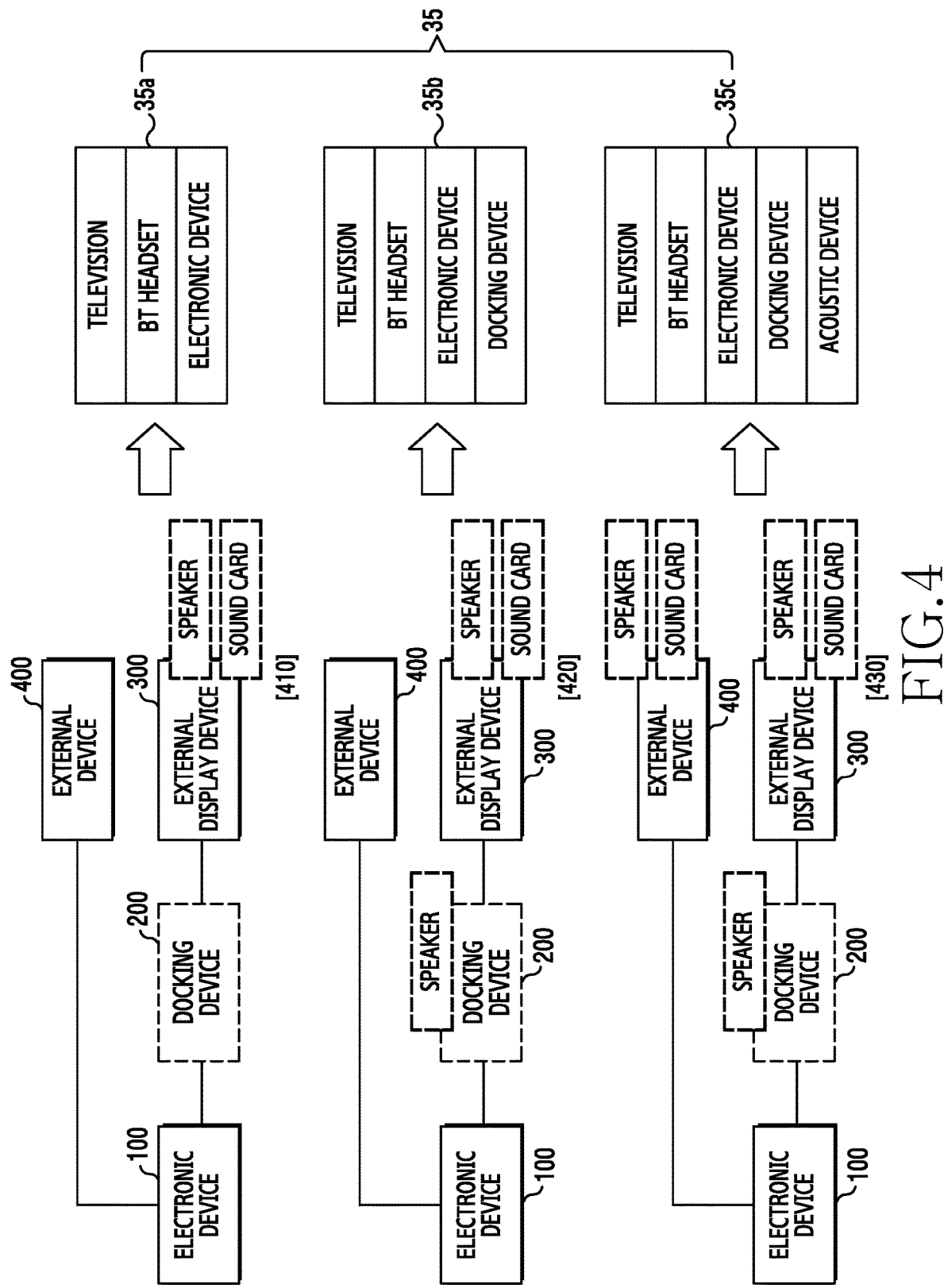
FIG. 4 is a diagram illustrating various examples of an audio path selection user interface (UI) according to an embodiment of the present disclosure.

FIG. 4 is a diagram illustrating various examples of an audio path selection user interface (UI) according to an embodiment of the present disclosure.

Referring to FIG. 4, the electronic device 100 according to various embodiments of the present disclosure may differentially configure a selection screen capable of changing an audio path according to whether a plurality of connected devices can output sound. For example, the electronic device 100 may differently configure the selection screen 35 capable of selecting an audio path on the basis of the presence or absence of speakers or sound cards of the docking device 200, the external display device 300, and the external device 400.

When the external display device 300 is a television including a speaker and/or a sound card, the electronic device 100 according to an embodiment of the present disclosure may configure a selection screen 35*a* to select one of the television, the electronic device, and a Bluetooth headset as shown in the drawing indicated by reference numeral 410, and may provide the configured selection screen 35*a* to the external display device 300.

According to some embodiments, the electronic device 100 may configure a selection screen to select either the television or the electronic device, and not the Bluetooth headset, when it is not connected (e.g., paired) to the Bluetooth headset, and may provide the configured selection screen to the external display device 300.

According to some embodiments, the electronic device 100 may configure a selection screen to select one of the television, the electronic device, a wired earphone, and the Bluetooth headset when an earphone is further connected, and may provide the configured selection screen to the external display device 300.

When the external display device 300 is a television including a speaker and/or a sound card and the docking device 200 includes a speaker, the electronic device 100 according to an embodiment of the present disclosure may configure a selection screen 35*b* to select one of the television, the docking device, the electronic device, and the Bluetooth headset as shown in the drawing indicated by reference numeral 420, and may provide the configured selection screen 35*b* to the external display device 300, as shown in the drawing indicated by reference numeral 420.

According to some embodiments, the electronic device 100 may configure a selection screen to select either the television, the docking device or the electronic device, but not the Bluetooth headset, when it is not connected (e.g., paired) to the Bluetooth headset, and may provide the configured selection screen to the external display device 300.

According to some embodiments, the electronic device 100 may configure a selection screen to select one of the television, the docking device, the electronic device, the wired earphone, and the Bluetooth headset when an earphone is further connected, and may provide the configured selection screen to the external display device 300.

When the external display device 300 is a television including a speaker and/or a sound card, the docking device 200 includes a speaker, and the external device 400 is an acoustic device including a speaker, the electronic device 100 according to an embodiment of the present disclosure may configure a selection screen 35*c* to select one of the television, the docking device, the acoustic device, the electronic device, and the Bluetooth headset, and may provide the configured selection screen 35*c* to the external display device 300. According to some embodiments, the electronic device 100 may configure a selection screen to select one of the television, the docking device, the acoustic device, and the electronic device when it is not connected (e.g., paired) to the Bluetooth headset, and may provide the configured selection screen to the external display device 300. According to some embodiments, the electronic device 100 may configure a selection screen to select one of the television, the docking device, the acoustic device, the electronic device, the wired earphone, and the Bluetooth headset when an earphone is further connected, and may provide the selected selection screen to the external display device 300.

According to some embodiments, the Bluetooth headset may be connected to at least one of the electronic device 100, the docking device 200, the external display device 300, and the external device 400.

According to some embodiments, when there is a plurality of Bluetooth headsets connected to the electronic device 100, the docking device 200, the external display device 300, or the external device 400, the selection screen 35 may include the plurality of Bluetooth headsets.

According to an embodiment, when the electronic device 100 supports the audio output simultaneously using a plurality of Bluetooth headsets, the selection screen 35 may be configured and provided so as to select the plurality of Bluetooth headsets.

Docking Device

Figure 5A:
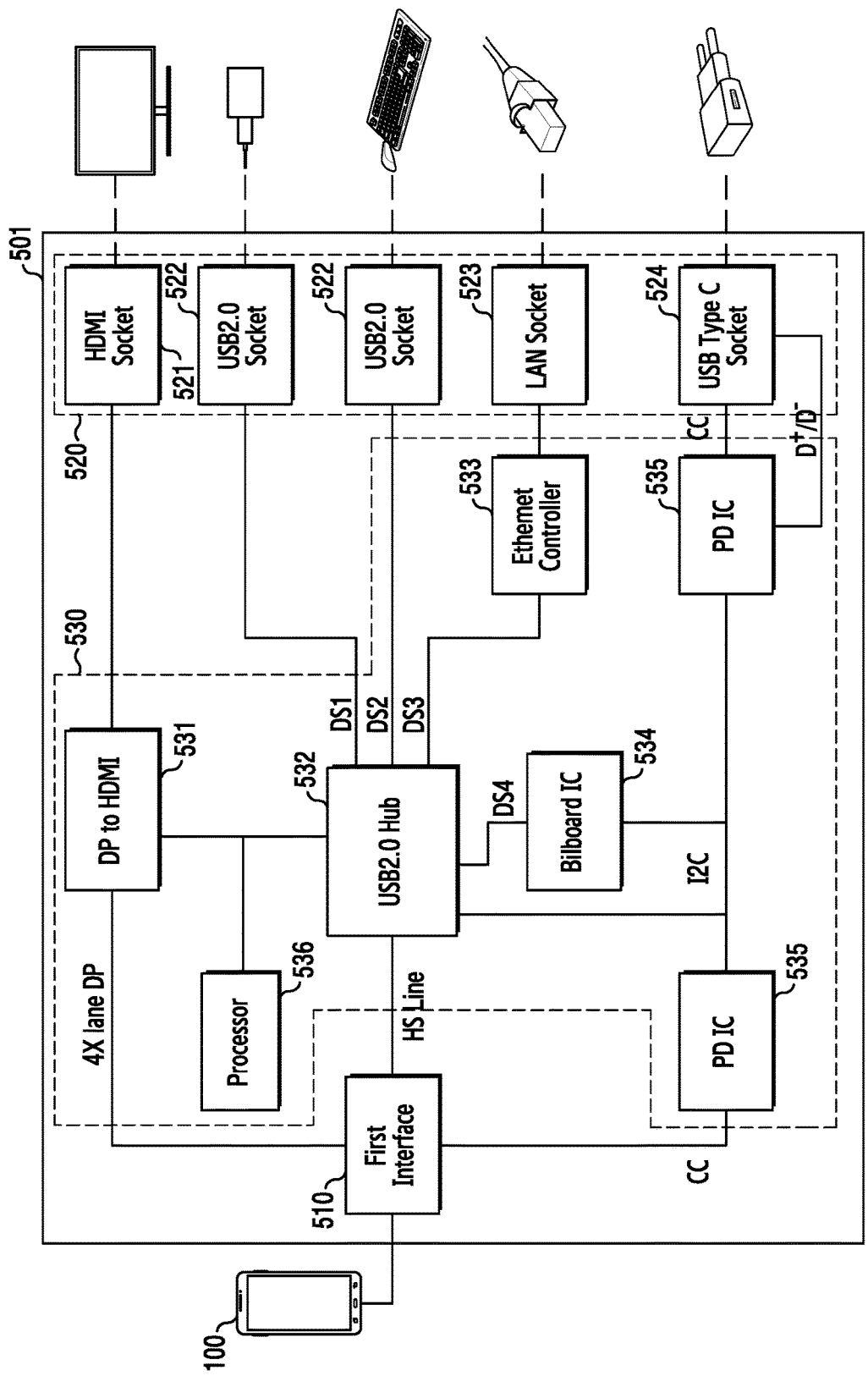
FIG. 5A is a block diagram illustrating the configuration of a docking device according to an embodiment of the present disclosure.

FIG. 5A is a block diagram illustrating the configuration of a docking device according to an embodiment of the present disclosure.

Referring to FIG. 5A, a docking device 501 (e.g., the docking device 200 of FIGS. 1A to 4) according to an embodiment of the present disclosure may include a first interface 510, a second interface 520, and a control circuit 530.

The first interface 510 may be a socket for connection with an electronic device (e.g., the electronic device 100 of FIGS. 1A to 4). The first interface 510 may be an interface of a USB type-C standard.

The second interface 520 may be a socket for connection with an external device. For example, the second interface 520 may include at least one of an HDMI socket 521, a USB 2.0 socket 522, a LAN socket 523, and a USB type-C socket 524. The HDMI socket 521, the USB 2.0 socket 522, the LAN socket 523, or the USB type-C socket 524 may be one or more. FIG. 5 illustrates an example where there are two USB 2.0 sockets (522 and 524). However, FIG. 5 is only an example, and the embodiment of the present disclosure is not limited thereto.

The control circuit 530 may include at least one control circuit for controlling the connection between the electronic device 100 and an external device (e.g., a television, a monitor, a router, a charger, a keyboard, or a mouse). For example, the control circuit 530 may include a DP to HDMI conversion circuit 531, a USB 2.0 hub 532, an Ethernet controller 533, a billboard integrated circuit (IC) 534, a power delivery (PD) IC 535, or a processor 536. However, the control circuit 530 shown in FIG. 5 is only an example, and the embodiment of the present disclosure is not limited thereto.

The DP to HDMI conversion circuit 531 may convert a 4-lane DP signal output from the electronic device 100 into an HDMI signal. The USB 2.0 hub 532 may control the connection of a plurality of external devices conforming to a USB 2.0 standard. The Ethernet controller 533 may control the connection of the router. The billboard IC 534 may control the connection of a billboard device. The PD IC 535 may control PD communication through the USB type-C socket 524.

The processor 536 may receive device information on an external device when the external device (e.g., a docking device or an external display device) is connected. The device information may include information on the presence or absence of a device (e.g., a sound card) capable of reproducing audio. According to some embodiments, the device information may include information on whether the external device includes a speaker or is connected to a speaker. The processor 536 may transmit the device information to the electronic device 100 when the connection of the electronic device 100 is detected. In certain embodiments, the docking device 501 can include a memory for maintaining records of external devices, such as external display devices, and their capabilities, including whether the external devices include speakers. Upon reconnection to the external device/external display device, the docking device 501 can look up the identity in the records.

According to some embodiments, whether the external device can perform an audio output may be confirmed by the electronic device 100. In this case, the docking device 501 may not include the processor 536.

Figure 5B:
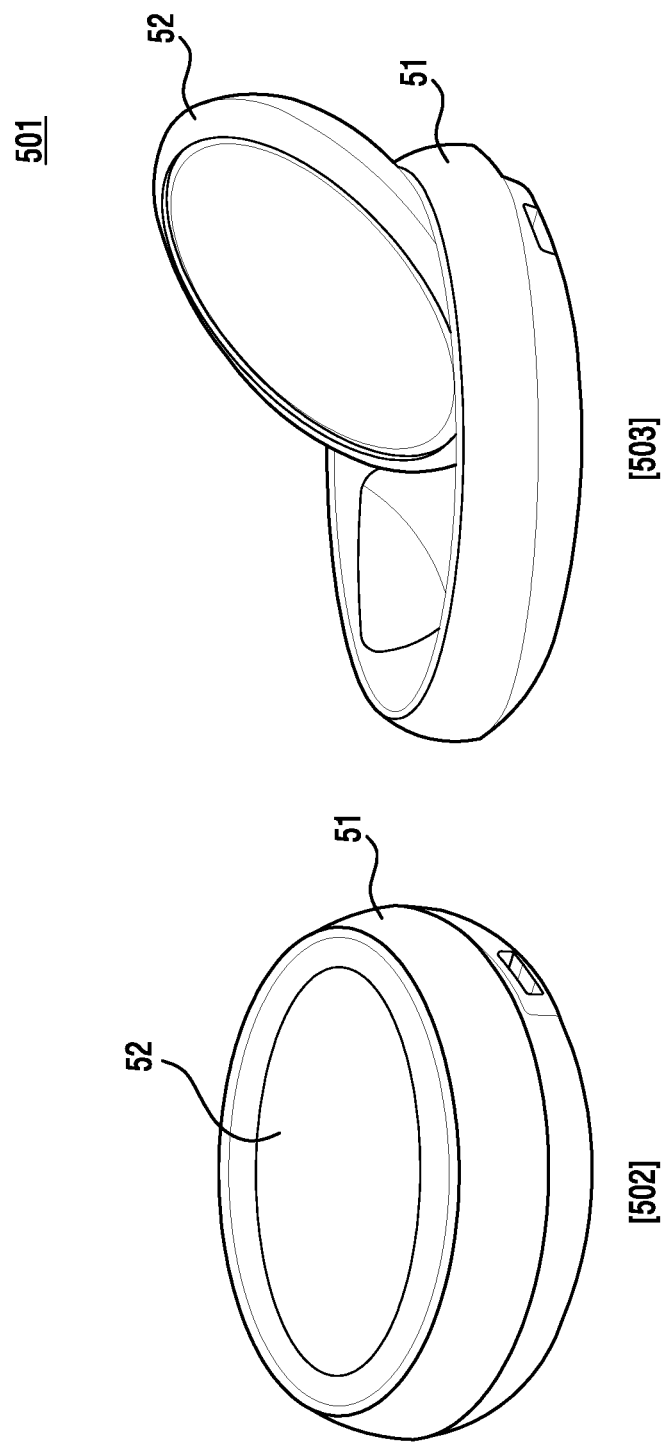
FIG. 5B illustrates a docking device according to an embodiment of the present disclosure.
Figure 5C:
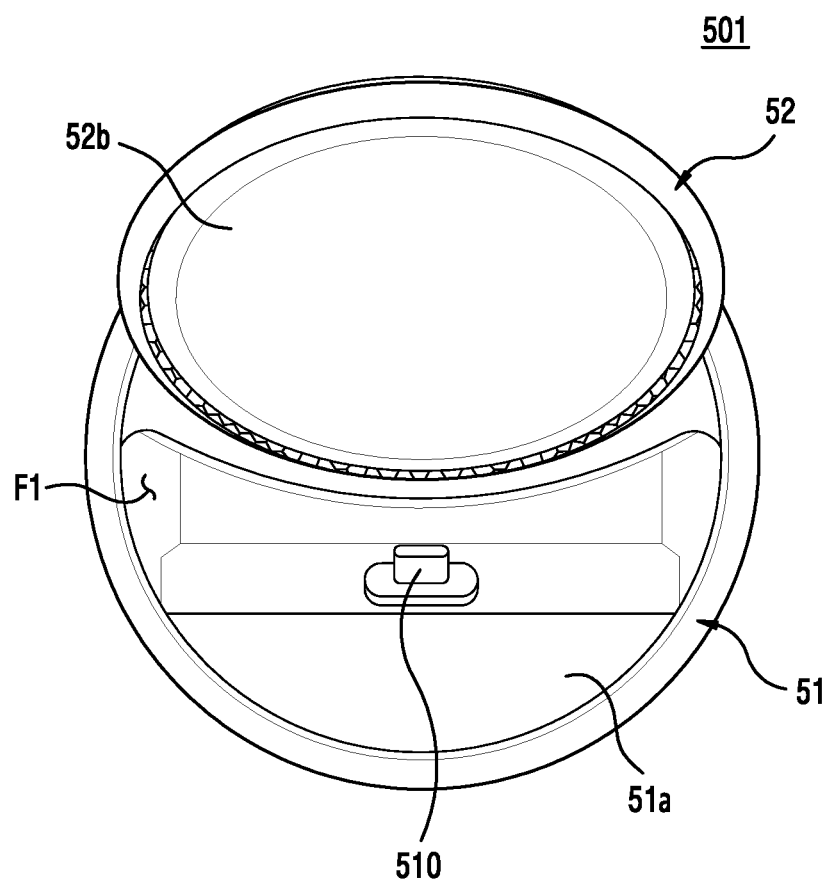
FIG. 5C illustrates a front surface of a docking device according to an embodiment of the present disclosure.
Figure 5D:
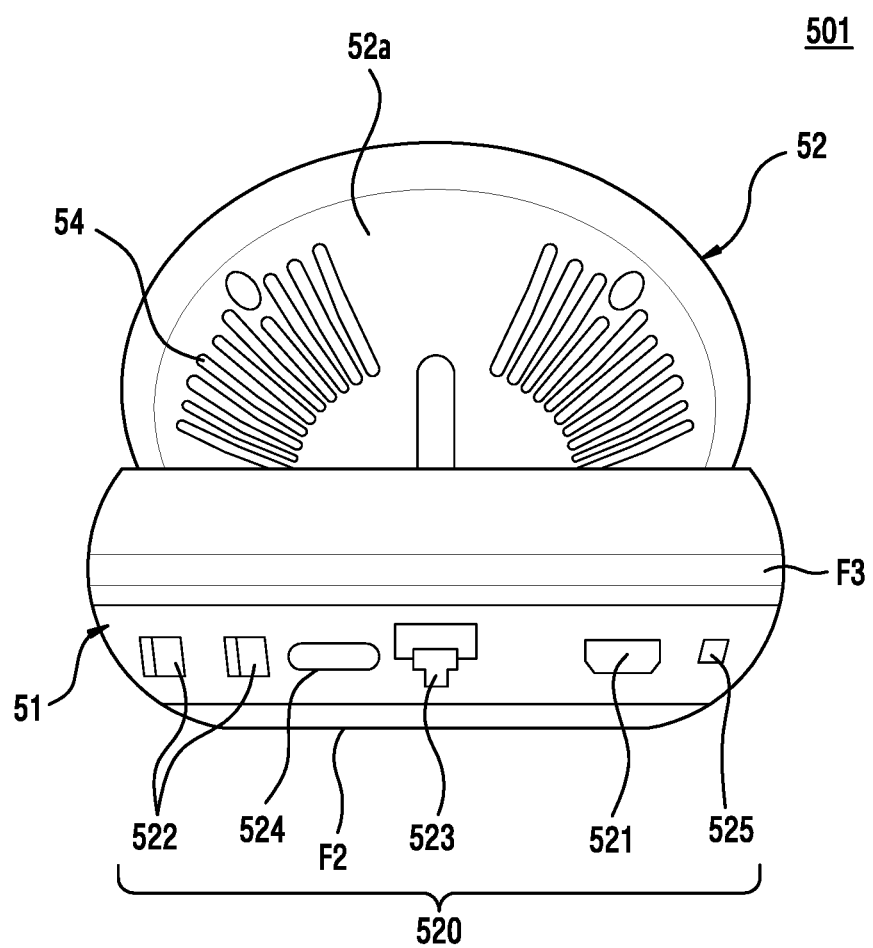
FIG. 5D illustrates a rear surface of a docking device according to an embodiment of the present disclosure.

FIG. 5B illustrates a docking device according to an embodiment of the present disclosure, FIG. 5C illustrates a front surface of a docking device according to an embodiment of the present disclosure, and FIG. 5D illustrates a rear surface of a docking device according to an embodiment of the present disclosure.

Referring to FIGS. 5B to 5D, the docking device 501 according to an embodiment of the present disclosure may include a first housing 51 and a second housing 52.

The docking device 501 may mount an electronic device (e.g., the electronic device 100) in the first housing 51 and may connect the mounted electronic device to another external device (e.g., the external display device 300, a keyboard, a mouse, a charger, a charging stand, etc.) or a network. For example, the docking device 501 may include a power socket 525 to supply power to the mounted electronic device, or may include the HDMI socket 521 to be connected to image appliances such as a monitor, a TV, and the like. The docking device 501 may include a LAN socket 523 to be connected to a wired network, or may include a USB 2.0 socket 522 or a USB type-C socket 524 to provide connection with various input/output devices, storage devices, chargers, and the like.

According to various embodiments, the first housing 51 may include a first surface F1, a second surface F2 facing a direction opposite the first surface F1, and a side surface F3 partially surrounding a space between the first surface F1 and the second surface F2. In a specific embodiment of the present disclosure, the first housing 51 is shown generally in the form of a cylinder or a circular truncated cone, but the present disclosure is not limited thereto. For example, the first surface F1 or the second surface F2 of the first housing 51 may have a polygonal shape. An example in which the side surface F3 has a convex shape is illustrated, but the side surface F3 may have a flat or concave shape.

The first housing 51 may include a mounting groove 51a for providing a space in which an electronic device (e.g., the electronic device 100) is detached and attached. The mounting groove 51a may have a size and shape capable of accommodating at least a portion of the electronic device. For example, the electronic device may be mounted in the first housing 51 by being mounted on the mounting groove 51a. According to some embodiments, a male connector, for example, the first interface 510, which is connected to an electronic device, may be located in the mounting groove 51a. The first interface 510 is a connector conforming to, for example, the USB type-C standard. The first interface 510 may be connected to at least one other second interface 520 via a control circuit (the control circuit 530 of FIG. 5A) located inside the first housing 51.

The second interface 520 may be located on the outer surface of the first housing 51, for example, on the side surface F3. The second interface 520 may include, for example, a power connector 525, an HDMI connector 521, a LAN connector 523, a USB 2.0 connector 522, a USB type-C connector 524, or the like.

The second housing 52 may be slidably fastened (or mounted) to the first housing 51. For example, the second housing 52 may be slidably moved from a first state (e.g., a closed state) to a second state (e.g., an open state) as shown in the drawings indicated by reference numerals 502 and 503 of FIG. 5B. Alternatively, the second housing 52 may be slidably moved from the second state to the first state.

When the second housing 52 is slidably moved to the second state and the mounting groove 51a of the first housing 51 is opened, the first interface 510 disposed in the mounting groove 51a may be exposed.

For example, the electronic device may be mounted in the first housing 51 (e.g., the mounting groove 51a) while the second housing 52 is positioned to be inclined. In another embodiment, the second housing 52 may be disposed to support one side of the electronic device mounted in the first housing 101.

According to various embodiments, the second housing 52 may include a curved case 52a and a flat case 52b. The flat case 52b may be coupled to the curved case 52a, and may be positioned on the first surface F1 or positioned to be inclined with respect to the first surface F1 (or the second surface F2) according to the slidable movement of the second housing 52.

According to various embodiments, various electrical components may be mounted in the second housing 52. For example, a cooling fan, a loop antenna, or the like may be mounted in the second housing 52. In one embodiment, the cooling fan can suppress and alleviate the heat generation of the mounted electronic device, and the loop antenna can establish communication with the electronic device mounted on the docking device 501. In some embodiments, the loop antenna may be utilized for wireless power transmission and may provide charging power or the like through the loop antenna when the mounted electronic device is equipped with a wireless charging function. According to an embodiment, the wireless charging function as described above may be provided even when the second housing 52 closes the mounting groove 51a. For example, when the electronic device equipped with the wireless charging function is placed on the first surface F1 or the second housing 102 even in the closed position, the loop antenna may transmit power wirelessly.

According to another embodiment, the second housing 102 may include a speaker (not shown) and may receive an acoustic signal from the electronic device through the first interface 510 or the loop antenna. For example, the speaker may receive the acoustic signal from the electronic device through the first interface 510 in a wired manner or in a Bluetooth communication manner through the loop antenna. In some embodiments, when a cooling fan, a speaker, or the like is mounted in the second housing 52, vent holes 54 for the flow of air or the output of sound may be provided. For example, a plurality of through-holes may be formed in the curved case 52a and/or the flat case 52b to smooth the flow of air or the output of sound.

According to various embodiments, the electronic component(s) included in the second housing 52 may be electrically connected to a printed circuit board embedded in the first housing 51.

Electronic Device

Figure 6A:
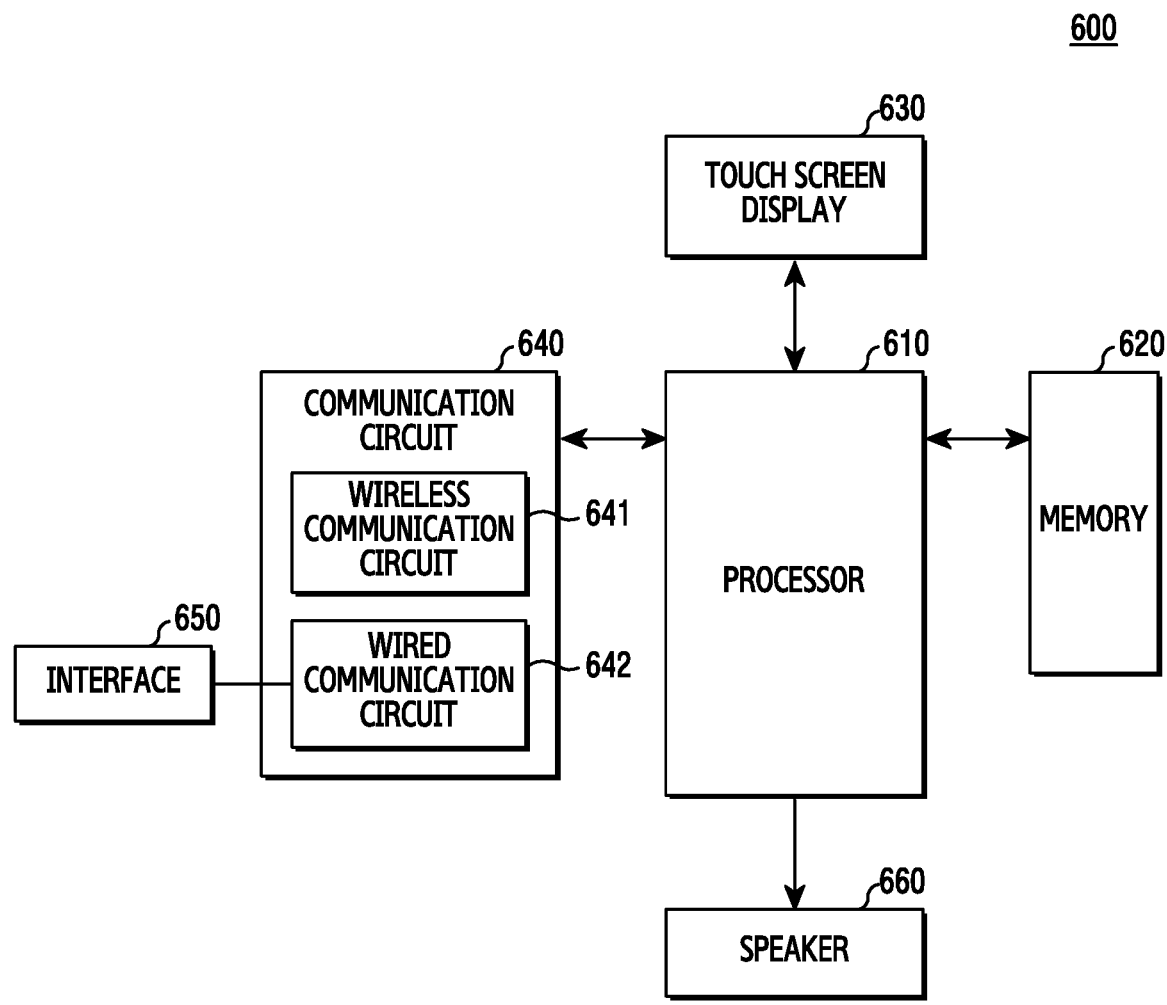
FIG. 6A is a block diagram illustrating the configuration of an electronic device according to an embodiment of the present disclosure.
Figure 6B:
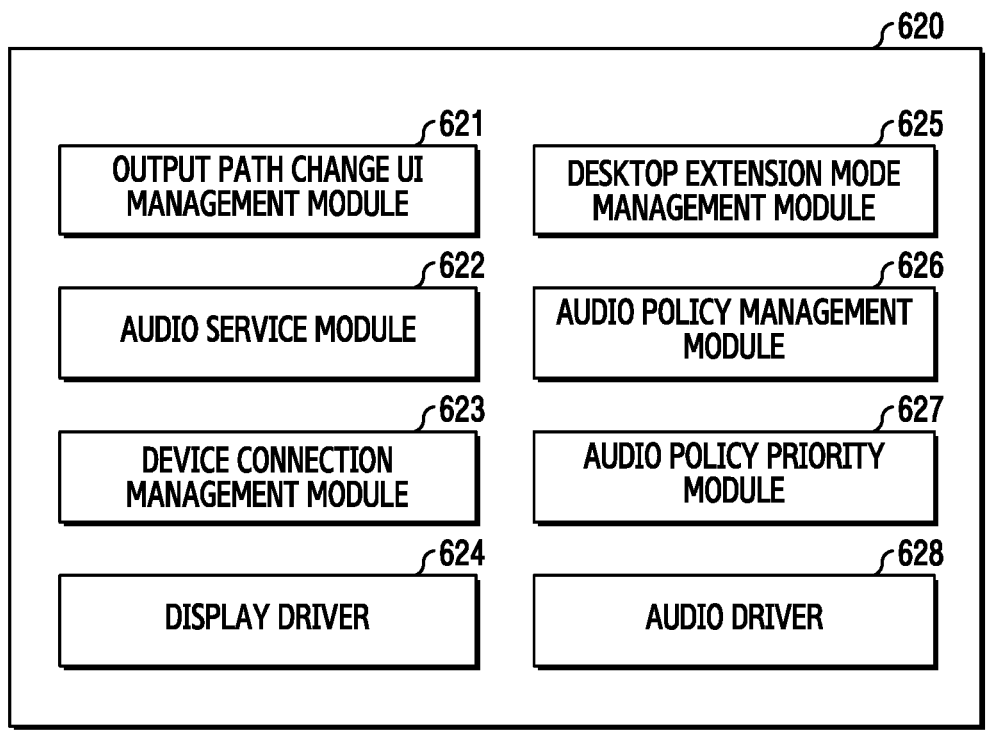
FIG. 6B is a block diagram illustrating a program module according to an embodiment of the present disclosure.

FIG. 6A is a block diagram illustrating the configuration of an electronic device according to an embodiment of the present disclosure, and FIG. 6B is a block diagram illustrating a program module according to an embodiment of the present disclosure.

Referring to FIGS. 6A and 6B, an electronic device 600 (e.g., the electronic device 100 of FIGS. 1A to 4) according to an embodiment of the present disclosure may include a processor 610, a memory 620, a touch screen display 630, a communication circuit 640, an interface 650, and a speaker 660. In certain embodiments, the electronic device 600 may include a housing including a first surface and a second surface facing the first surface. The touch screen display 630 can be disposed at surface of the housing.

The processor 610 may control the overall operation of the electronic device 600. For example, the processor 610 may be located inside the housing and may be electrically connected to the touch screen display 630, the communication circuit 640, the speaker 660, and the memory 620, thereby controlling the respective components of the electronic device 600. The processor 610 may receive instructions from the memory 620 and may control the respective components according to the received instructions to perform various functions. The processor 610 may be formed of a central processing unit (CPU), an application processor (AP), a micro control unit (MCU), a microprocessor unit (MPU), and the like. The processor 610 may be formed of a single core processor or a multi-core processor. According to another embodiment, the processor 610 may be a multi-processor including multiple processors. For example, the processor 610 may include an AP and a communication processor (CP). In another embodiment, the processor 610 may include a high power processor (e.g., AP) and a low power processor (e.g., MCU or MPU).

The processor 610 according to various embodiments of the present disclosure may control an audio output path when a video content or an audio content is reproduced. For example, the processor 610 may control the audio path so that audio is output through the speaker 660, an earphone, or a Bluetooth headset. Alternatively, the processor 610 may detect connection of the electronic device 100 to a docking device or the external display device, and may control the audio path so that audio is output through one of the speaker 660, the earphone, the Bluetooth headset, the speaker of the docking device, and the speaker of the external display device when the desktop extension mode is executed. A detailed description thereof will be made later with reference to FIGS. 7 to 10.

The memory 620 may be located inside the housing and may be electrically connected to the processor 610. The memory 620 may store various programs for operating the electronic device 600, and may store data generated during the execution of the various programs, downloaded data, and the like. The memory 620 may also store various commands and/or instructions for operating the processor 610. The memory 620 may include at least one of an internal memory and an external memory. In certain embodiments, the memory 620 can maintain records of external devices, such as external display devices, and their capabilities, including whether the external devices include speakers. Upon reconnection to the external device/external display device, the processor 610 can look up the identity in the records.

According to various embodiments of the present disclosure, the memory 620 may store various program modules for controlling the audio path of the electronic device 600. For example, as shown in FIG. 6B, the memory 620 may include an output path change UI management module 621, an audio service module 622, a device connection management module 623, a display driver 624, a desktop extension mode management module 625, an audio policy management module 626, an audio policy priority module (database) 627, and an audio driver 628. According to an embodiment, the display driver 624 may be included in a display driving circuit (DDI) of the touch screen display 630.

The output path change UI management module 621 may control the display of the selection screen. The output path change UI management module 621 may receive audio path change information from the audio service module 622 and may update the received audio path change information.

The audio service module 622 may provide an audio service. The audio service module 622 may transmit state information of the electronic device 600 and connection information of the external display device to the audio policy management module 626. The state information may include a mirroring mode, a desktop extension mode including an audio output device, a desktop extension mode not including an audio output device, and a normal mode.

The device connection management module 623 may detect the connection and/or release of a docking device, an external device, or an external display device. The device connection management module 623 may transmit an event notifying the connection and/or release to the audio service module 622.

The display driver 624 may output an image. For example, the display driver 624 may output an image on the touch screen display 630 of the electronic device 600 or the external display device. The display driver 624 according to various embodiments of the present disclosure may output the image on the external display device when the desktop extension mode is executed.

The desktop extension mode management module 625 may manage the desktop extension mode. The audio policy management module 626 may select a device to output audio according to a set priority, may change the audio output path, and may transmit the changed path to the audio service module 622.

The audio policy priority module 627 may store a priority policy of audio paths of connected external devices. For example, the priority policy may be a first priority; Wi-Fi (wireless connection), a second priority; Bluetooth connection, a third priority; earphone, a fourth priority; USB/HDMI, a fifth priority; terminal speaker, and the like.

The audio driver 628 may output audio. The audio driver 628 may output audio through a default path or a changed path.

The memory 620 according to various embodiments of the present disclosure may store a change history of the audio path. A detailed description thereof will be made later with reference to FIG. 9.

The touch screen display 630 may be exposed through the first surface of the housing and may provide input and output functions. For example, the touch screen display 630 may include a touch panel and a display panel. The display panel may be formed of, for example, a liquid crystal display (LCD), a light-emitting diode (LED) display, an organic light-emitting diode (OLED) display, a microelectromechanical system (MEMS) display, or an electronic paper display. The touch screen display 630 may detect (or recognize) a change in physical characteristics (electrostatic capacity or frequency) due to various touch inputs (e.g., tap, double tap, touch, touch movement, multi-touch, or pressure touch) using an input tool such as a touch panel finger, a stylus, or an electronic pen, and may transmit the detected change to the processor 610. The touch panel may include a first panel (not shown) for sensing a touch using a finger, a second panel (not shown) for recognizing an electronic pen, and/or a third panel (not shown) for sensing a pressure.

The screen of the touch screen display 630 according to various embodiments of the present disclosure may be turned off when the electronic device 600 is docked with the docking device and the desktop extension mode is executed.

The touch screen display 630 according to various embodiments of the present disclosure may display a selection screen (e.g., a second UI) capable of changing an audio output path when the desktop extension mode is executed during the reproduction of a video or audio content. Alternatively, the touch screen display 630 may display the selection screen when the reproduction of the video or audio content is requested in a state in which the desktop extension mode is executed.

The touch screen display 630 according to various embodiments of the present disclosure may operate at least some regions thereof as a touch pad for receiving a user input when the desktop extension mode is executed. For example, when a pointing device (e.g., a mouse or a touch pad) is not connected to the electronic device in a wired communication and/or wireless communication manner in the desktop extension mode, the electronic device may operate at least some regions of the touch screen display 630 as a pointing device.

The touch screen display 630 according to various embodiments of the present disclosure may detect a user selection that selects a device for outputting audio on the selection screen, and may transmit the detected user selection to the processor 610.

The touch screen display 630 according to various embodiments of the present disclosure may display a button (e.g., the audio path setting button 34) for turning on/off the display of the selection screen when the desktop extension mode is executed.

The communication circuit 640 may be located inside the housing and may perform wired and/or wireless communication. For example, the communication circuit 640 may include at least one wireless communication circuit 641 and/or at least one wired communication circuit 642.

The wireless communication circuit 641 may provide a wireless communication connection. For example, the wireless communication circuit 641 may provide Wi-Fi communication and/or Bluetooth communication. The wireless communication circuit 641 according to an embodiment of the present disclosure may support a connection of an external device such as a keyboard or a mouse. For example, the wireless communication circuit 641 may receive a signal for selecting a button from the mouse or the keyboard and may provide the received signal to the processor 610.

The wireless communication circuit 641 according to an embodiment of the present disclosure may establish communication with a Bluetooth headset, a Bluetooth speaker, or the like. For example, the wireless communication circuit 641 may transmit audio to the Bluetooth headset or the Bluetooth speaker and may receive an input signal (e.g., a volume control signal, a call connection signal, a pairing request signal, or the like) from the Bluetooth headset or the Bluetooth speaker.

The wireless communication circuit 641 according to an embodiment of the present disclosure may receive information (e.g., a database) on the compatibility of the desktop extension mode with applications (or apps) installed in the electronic device 600 from a server (e.g., the server 500 of FIG. 1B). The information may be periodically received, received during the execution of the desktop extension mode, or received upon a user request.

According to some embodiments, the wireless communication circuit 641 may support a wireless communication connection with an external display device. For example, the wireless communication circuit 641 may support a wireless desktop extension mode.

The wired communication circuit 642 may provide a wired communication connection. For example, the wired communication circuit 642 may provide USB communication (e.g., USB type-C). The wired communication circuit 642 according to an embodiment of the present disclosure may support wired communication with an external display device through a docking device. According to some embodiments, the wired communication circuit 642 may support wired communication between the electronic device 100 and an external display device.

Under the control of the processor 610, the wired communication circuit 642 according to various embodiments of the present disclosure may transmit first data for rendering a first user interface on the external display device, and/or may transmit, to the external display device, second data for rendering a second user interface that allows a user to select one of the electronic device 600 for providing audio generated from the electronic device 600 or audio relayed through the electronic device 600 and the external display device.

The wired communication circuit 642 according to various embodiments of the present disclosure may transmit audio of a currently reproduced video content or audio content to the external display device, in response to the reception of a user input that changes the audio output path to the external display device.

The wired communication circuit 642 according to various embodiments of the present disclosure may receive device information of the external display device and/or the docking device at the time of the connection of the external display device and/or the docking device. The device information may include information on the presence or absence of a device (e.g., a sound card) capable of reproducing audio. According to some embodiments, the device information may include information on whether the external device includes a speaker or a speaker is connected to the external device.

The interface 650 may be an external display device or an interface device for a connection with a docking device. For example, the interface 650 may be a USB Type-C standard socket. The interface 650 may include an audio interface (e.g., a three-pole connector, a four-pole connector, or the like) for earphone connection.

The speaker 660 may output audio. The speaker 660 may be exposed through the housing of the electronic device 600.

According to various embodiments of the present disclosure, an electronic device (e.g., the electronic device 100 of FIGS. 1 to 4, or the electronic device 600 of FIG. 6a) may comprise a housing; a touch screen display (e.g., the touch screen display 630 of FIG. 6a) disposed on a surface of the housing; at least one wireless or wired communication circuit (e.g., the communication circuit 640 of FIG. 6a) located inside the housing; a speaker (e.g., the speaker 660 of FIG. 6a) exposed through the housing; at least one processor (e.g., the processor 610 of FIG. 6a) located inside the housing and electrically connected to the display, the communication circuit, and the speaker; and a memory (e.g., the memory 620 of FIG. 6a) located inside the housing and electrically connected to the processor, wherein the memory may store instructions that, when executed, cause the at least one processor to detect that the electronic device is communicating with an external display device (e.g., the external display device 300 of FIGS. 1 to 4) through the communication circuit, provide first data for rendering a first user interface on the external display device to the external display device through the communication circuit when it is detected that the electronic device is communicating with the external display device, detect whether the external display device can provide output audio, when the external display device can provide output audio, provide to the external display device through the communication circuit, second data configured to render a second user interface that allows a user to select one of the electronic device and the external display device for providing audio that is generated from or relayed through the electronic device, receive a selection of one of the electronic device and the external display device through the communication circuit or the touch screen display, and adapt an audio output path of the electronic device so that audio is provided on the basis of the selection when the selection is received.

According to various embodiments, the instructions cause the at least one processor to provide audio through the speaker by default after detecting that the electronic device is communicating with the external display device.

According to various embodiments, the electronic device may further comprise an audio interface to which an earphone is connected, the instructions cause the at least one processor to provide audio through the audio interface by default after detecting that the electronic device is communicating with the external display device.

According to various embodiments, the instructions cause the at least one processor to provide audio data to another external device including a speaker through the communication circuit by default after detecting that the electronic device is communicating with the external display device.

According to various embodiments, the instructions cause the at least one processor to receive a user input selecting the button through the communication circuit or the touch screen display, and wherein the second data is configured to render a button on at least a portion of the external display device, and display the second user interface on the external display device when receiving the user input.

According to various embodiments, the instructions cause the at least one processor to receive an indication from the external display device indicating that an output of audio is possible via the communication circuit, and to provide the second data to the external display device responsive to receiving the indication that the output of audio is possible.

According to various embodiments, the external display device and the electronic device may be connected through a docking device.

According to various embodiments, the instructions cause the at least one processor to detect a communication disconnection with the external display device and to output audio through a default output path of the electronic device in response to the detection of the communication disconnection.

According to various embodiments, the instructions cause the at least one processor to automatically change the audio output path so that audio is output through the external display device, when a change history of the audio output path to the external display device exists.

According to various embodiments, the instructions cause the at least one processor to store a change history of the adapted audio output path in response to the detection of the communication disconnection.

According to various embodiments, the instructions cause the at least one processor to change the audio output path so that audio is provided to a default output path of the electronic device when occurrence of a call event is detected while audio is provided to the external display device, and to change the audio output path to the external display device when a reconnection of the external display device is detected within a designated time period after the call event is terminated.

Figure 7:
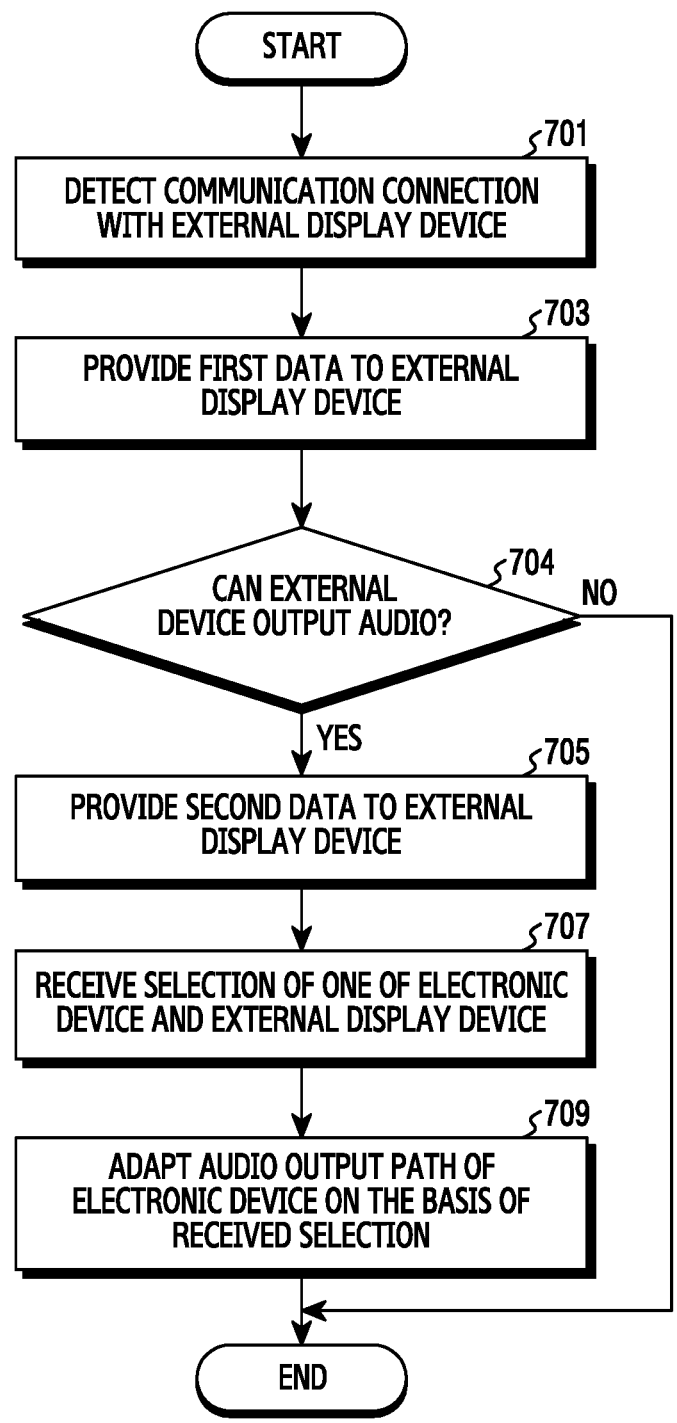
FIG. 7 is a flowchart illustrating a procedure for controlling an audio path of an electronic device according to an embodiment of the present disclosure.

FIG. 7 is a flowchart illustrating a procedure for controlling an audio path of an electronic device according to an embodiment of the present disclosure.

Referring to FIG. 7, in operation 701, an electronic device (e.g., the electronic device 100 of FIGS. 1A to 4 or the electronic device 600 of FIG. 6A) according to an embodiment of the present disclosure may detect a communication connection with an external display device (e.g., the external display device 300 of FIGS. 1A to 4). For example, a processor (e.g., the processor 610 of FIG. 6A) may perform or detect a communication connection with an external display device through a communication circuit (the communication circuit 640 of FIG. 6A). According to an embodiment, the electronic device may be connected to the external display device through a docking device (e.g., the docking device 200 of FIGS. 1A to 4 or the docking device 501 of FIG. 5). According to another embodiment, the electronic device may be connected to the external display device through a wired communication circuit (e.g., HDMI, DP, or USB type-C). According to another embodiment, the electronic device may be connected to the external display device or the docking device connected to the external display device through a wireless communication circuit (e.g., Wi-Fi direct or Bluetooth).

When the connection of the external display device is detected, the processor may activate (or execute) the desktop extension mode. According to some embodiments, the processor may execute the desktop extension mode in response to the reception of a user input (e.g., touching a menu or icon) for executing the desktop extension mode. When the connection of the external display device is detected, the processor may receive information on an audio output enabled state of the external display device. According to some embodiments, the processor may receive information on the audio output enabled state of the docking device or external devices. According to an embodiment, the processor may receive information on an output enabled state of audio output devices connected to a docking device, an electronic device, an external display device, or an external device.

In operation 703, the processor according to an embodiment of the present disclosure may provide first data to the external display device. The first data may be data for rendering a first user interface on the external display device. For example, the first user interface may be a home screen in the desktop extension mode. According to some embodiments, the first user interface may include a home screen in the desktop extension mode and a currently executed application (e.g., a video (or audio) reproducing application) screen.

At operation 704, a determination is made whether the external display device can output audio. If the external display device cannot output audio, operations 705-709 are bypassed.

When the external display device can output audio, in operation 705, the processor according to an embodiment of the present disclosure may provide second data to the external display device. The second data may be data for rendering a second user interface that allows a user to select one of the electronic device and the external display device to provide audio that is generated from or relayed through the electronic device. For example, the processor may provide the second data to the external display device in response to a user input (e.g., button click or touch) requesting the display of the second user interface. According to some embodiments, the processor may provide the second data to the external display device when at least one of the connected docking device, external display device, and external device is a device (e.g., a device including a sound card) capable of outputting audio. According to an embodiment, when the electronic device is connected to the external display device through the docking device, the audio that is generated from or relayed through the electronic device may be transmitted to the external display device through the docking device.

In operation 707, the processor according to an embodiment of the present disclosure may receive a selection of either the electronic device or the external display device. For example, when a user selects one of the electronic device and the external display device on the second user interface via a pointing device (e.g., a mouse) connected to the electronic device or docking device, the processor may recognize the selection.

According to some embodiments, the processor may receive the selection through a touch input that is generated in the second user interface displayed on a touch screen display (e.g., the touch screen display 630 of FIG. 6A) exposed through a portion of the surface of the electronic device. For example, at least a portion of the touch screen display of the electronic device may operate as a pointing device (e.g., a touch pad) and thereby may receive a user's selection.

In operation 709, the processor according to an embodiment of the present disclosure may adapt the audio output path of the electronic device on the basis of the selection. For example, when the electronic device is selected, the processor may adapt the audio output path so that audio is output through the speaker of the electronic device (e.g., the speaker 160 of FIGS. 3A to 3E or the speaker 660 of FIG. 6A). By way of another example, when another external device (e.g., an earphone or a Bluetooth earphone) including a speaker is selected, the processor may adapt the audio output path so that audio is output via the other external device (e.g., an earphone or a Bluetooth earphone). By way of still another example, when the external display device is selected, the processor may adapt the audio output path so that audio is output via the speaker of the external display device. By way of yet another example, when the docking device including a speaker is selected, the processor may adapt the audio output path so that audio is output via the speaker of the docking device.

Figure 8:
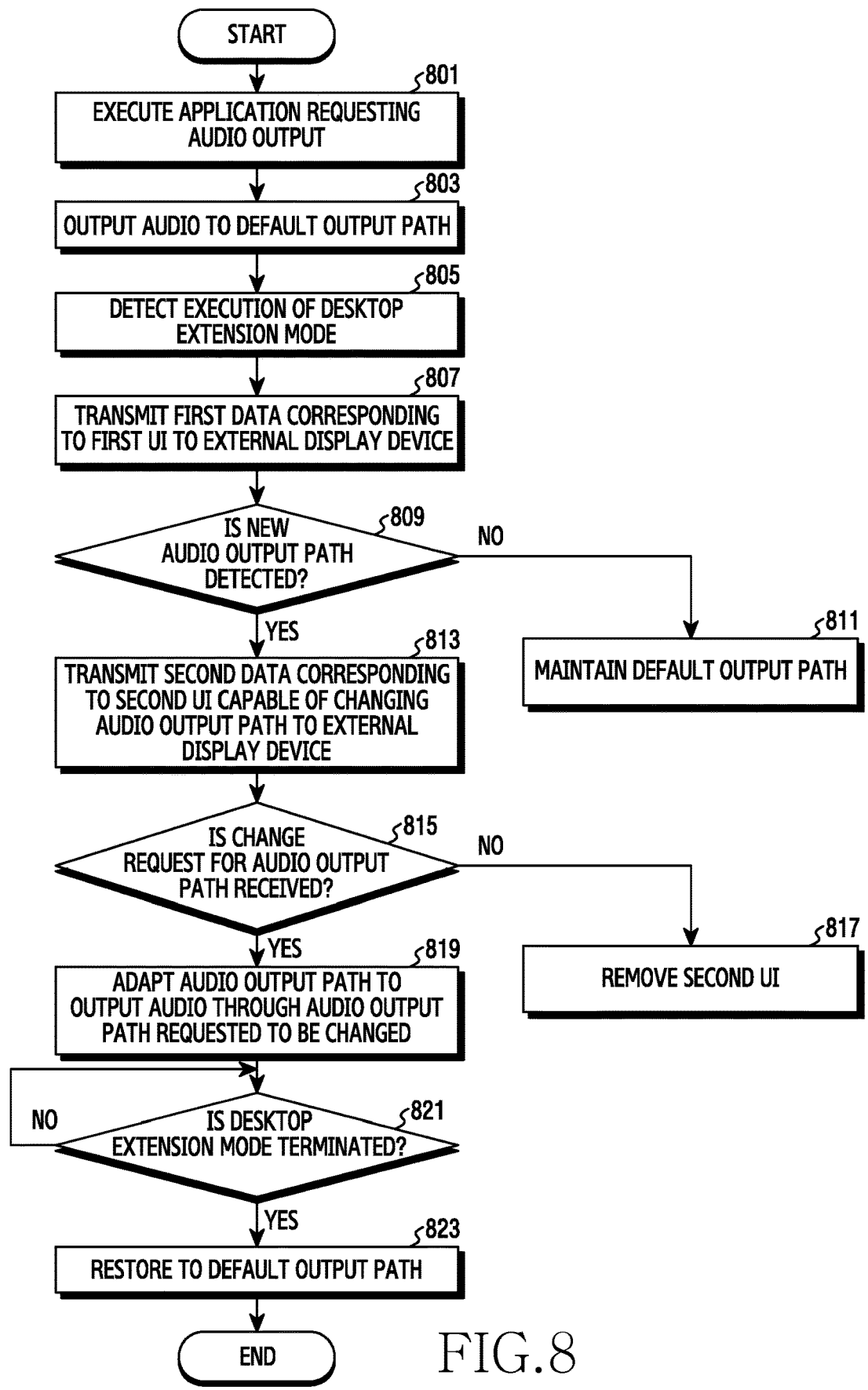
FIG. 8 is a flowchart illustrating a procedure for controlling an audio path of an electronic device according to an embodiment of the present disclosure.

FIG. 8 is a flowchart illustrating a procedure for controlling an audio path of an electronic device according to an embodiment of the present disclosure.

Referring to FIG. 8, in operation 801, at least one processor (e.g., the processor 610 of FIG. 6A) of an electronic device (e.g., the electronic device 100 of FIGS. 1A to 4 or the electronic device 600 of FIG. 6A) according to an embodiment of the present disclosure may detect the execution of an application requesting an audio output. For example, the at least one processor may detect a reproduction request for a video content and/or an audio content (e.g., music file) which is downloaded in real-time through a communication circuit (e.g., the communication circuit 640 of FIG. 6A) stored in a memory (e.g., the memory 620 of FIG. 6A).

In operation 803, the at least one processor according to an embodiment of the present disclosure may output audio to a default output path. The default output path may be a path configured such that audio is output through a speaker included in the electronic device when an external device (e.g., an earphone, a Bluetooth earphone, or a Bluetooth speaker) is not connected to the electronic device, or may be a path configured such that audio is output through the connected external device when the external device (e.g., an earphone, a Bluetooth earphone, or a Bluetooth speaker) is connected to the electronic device. Meanwhile, the at least one processor may output an application screen that reproduces a video or audio content through a display (e.g., the display 130 of FIGS. 3A to 3E or the touch screen display 630 of FIG. 6A) included in the electronic device.

In operation 805, the processor according to an embodiment of the present disclosure may detect the execution of the desktop extension mode. According to an embodiment, the desktop extension mode may be automatically executed when a communication connection with a docking device to which the external display device is connected or with the external display device is detected. According to an embodiment, the desktop extension mode may be executed by the docking device to which the external display device is connected, or may be executed by a user's request after the communication connection with the external display device.

In operation 807, the at least one processor according to an embodiment of the present disclosure may transmit first data corresponding to the first user interface to the external device using a communication circuit (e.g., the communication circuit 640 of FIG. 6A). For example, the first data may be data corresponding to a home screen in the desktop extension mode. According to some embodiments, the first data may include data corresponding to the home screen and data corresponding to the application screen executed in operation 801. For example, when the executed application supports the desktop extension mode, the first data may include data corresponding to the home screen and the application screen.

In operation 809, the processor according to an embodiment of the present disclosure may confirm whether a new audio output path is detected. For example, the at least one processor may confirm whether there is an external display device connected through a wireless communication circuit or a wired communication interface of HDMI, DP, and USB type-C standard capable of outputting an audio signal. According to some embodiments, the at least one processor may confirm whether a sound card exists in the connected external display device or docking device or the connected external device (e.g., a speaker, an earphone, or a headset) exists.

In operation 811, when the new audio output path is not detected on the basis of the confirmation result of operation 809, the processor according to an embodiment of the present disclosure may maintain the default output path.

In operation 813, when the new audio output path is detected on the basis of the confirmation result of operation 809, the at least one processor according to an embodiment of the present disclosure may transmit second data corresponding to a second UI that can change the audio output path, to the connected external display device. According to some embodiments, the at least one processor may provide the second data corresponding to the second UI to the external display device when a button requesting the display of the second UI is selected. Here, the second UI may include a plurality of audio output devices capable of outputting audio. The second UI may be changed depending on the number of external devices connected to the electronic device and whether an audio output is supported. For example, when the electronic device is connected to a Bluetooth earphone, a docking device, and a television, the second UI may include a speaker of the electronic device, the Bluetooth earphone, the docking device, and the television. According to an embodiment, the at least one processor may receive information about a new path that can perform an audio output from the external display device or the docking device, and may generate the second UI on the basis of the received information.

In operation 815, the at least one processor according to an embodiment of the present disclosure may confirm whether a change request for the audio output path is received. The change request for the audio output path may be input by a user. For example, a user may select one of a plurality of audio output devices included in the second UI through an input device (e.g., a mouse, a keyboard, a touch pad, or a joystick) connected through the electronic device or the docking device. According to an embodiment, the second UI may be displayed for a certain time period (e.g., about 5 minutes) and then removed when a button (e.g., the audio path setting button 34 of FIG. 3) requesting the display of the second UI is selected, or may be removed when the button 34 is selected redundantly.

In operation 817, when the change request for the audio output path is not received for the certain time period or the audio output path change is canceled (e.g., when the button 34 is selected redundantly) on the basis of the confirmation result of operation 815, the at least one processor according to an embodiment of the present disclosure may remove the second UI.

In operation 819, when the change request for the audio output path is received on the basis of the confirmation result of operation 815, the at least one processor according to an embodiment of the present disclosure may adapt audio output path to output audio through the audio output path requested to be changed. For example, when the external display device is selected, the at least one processor may control the audio path so that audio data is output through the speaker of the external display device.

In operation 821, the at least one processor according to an embodiment of the present disclosure may confirm whether the desktop extension mode is terminated. The desktop extension mode may be terminated upon disconnection, mode change (e.g., switched to a mirroring mode), or an event (e.g., call reception) occurrence.

When the desktop extension mode is not terminated on the basis of the confirmation result of operation 821, the at least one processor may maintain operation 821. According to some embodiments, the at least one processor may return to operation 813 when a display request for the second UI is generated (e.g., the selection of the audio path setting button is received).

In operation 823, when the desktop extension mode is terminated on the basis of the confirmation result of operation 821, the at least one processor may restore the audio path to the default output path and may terminate the audio path control procedure. For example, the at least one processor may delete an audio path change history to the external display device when the desktop extension mode is terminated.

According to some embodiments, the at least one processor may store the changed audio output path as a change history. The stored change history may be used to automatically adapt the audio path so that the external display device outputs audio at the time of a reconnection to the external display device.

According to an embodiment, the order of an operation (e.g., operation 801) of executing an application requesting an audio output and the order of an operation (e.g., operations 813 to 819) of changing the audio output path may be changed. For example, a user may execute the application requesting the audio output after the audio output path is changed.

Figure 9:
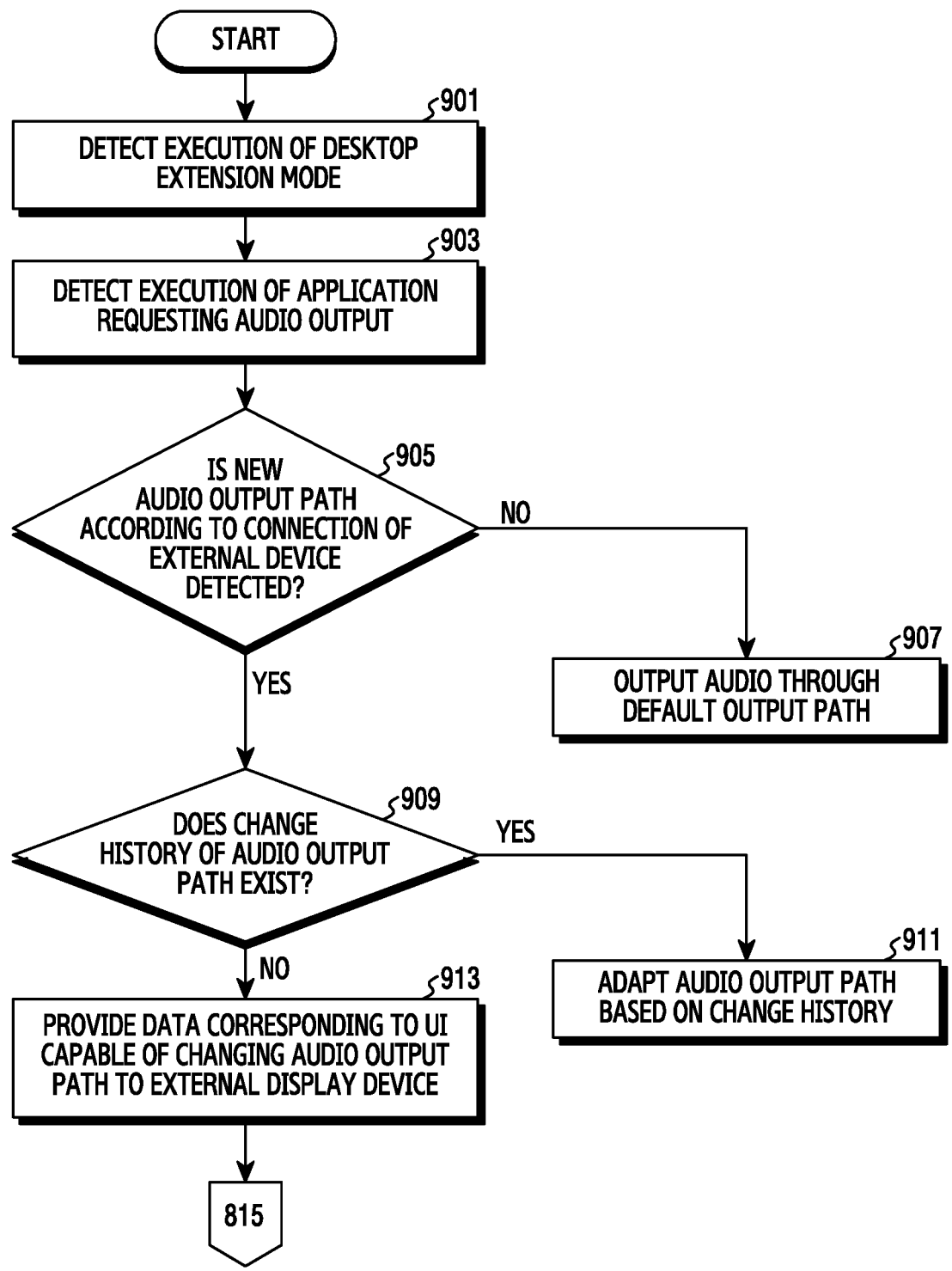
FIG. 9 is a flowchart illustrating a procedure for controlling an audio path of an electronic device on the basis of an audio path change history according to an embodiment of the present disclosure.
Figure 10:
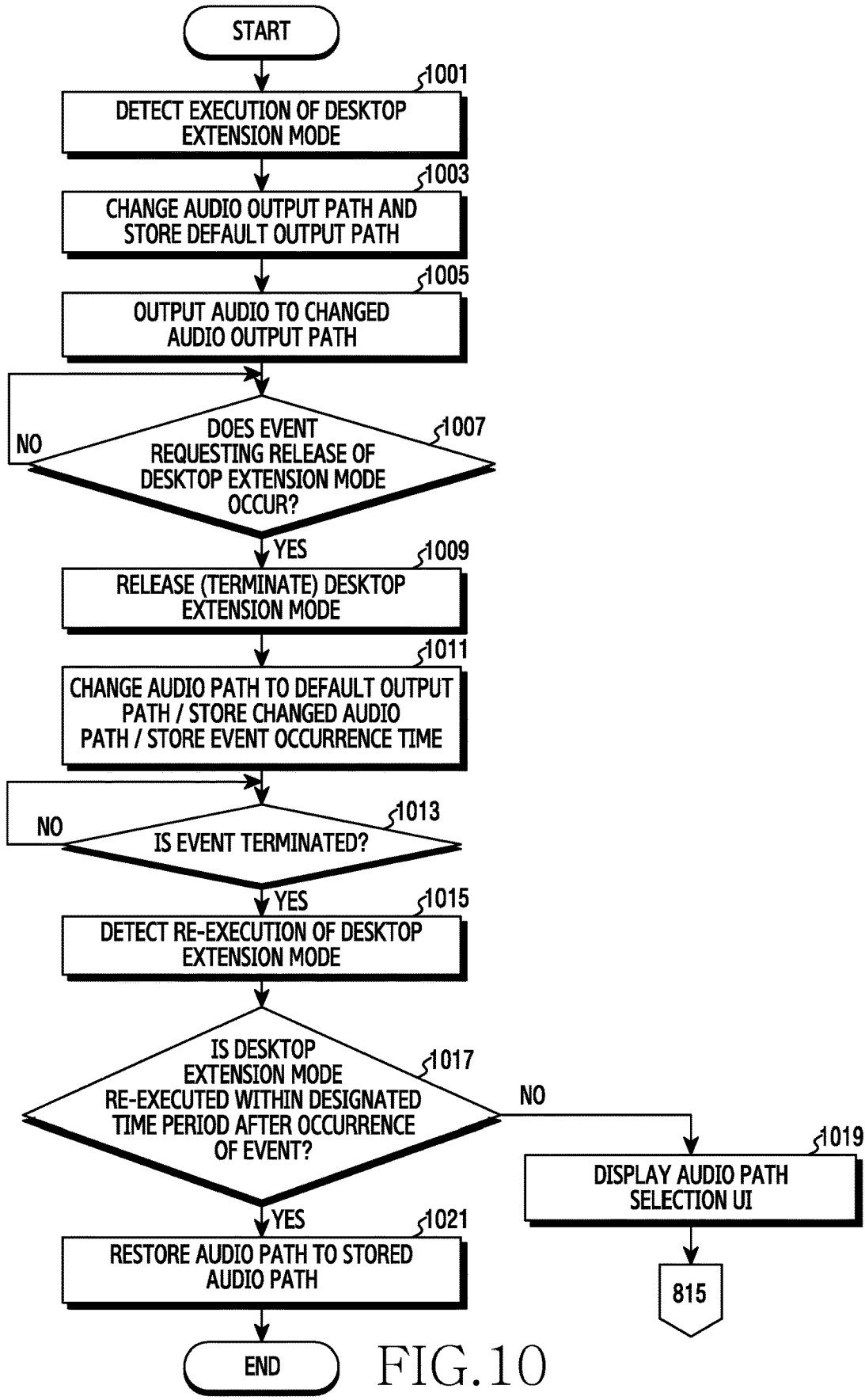
FIG. 10 is a flowchart illustrating a procedure for controlling an audio path of an electronic device according to an event occurrence according to an embodiment of the present disclosure.

Operations 815-823 can also be invoked following detection of a change from a history of audio output path selections, as in FIG. 9, or interruption of the desktop extension mode, as in FIG. 10.

FIG. 9 is a flowchart illustrating a procedure for controlling an audio path of an electronic device on the basis of an audio path change history according to an embodiment of the present disclosure.

Referring to FIG. 9, in operation 901, at least one processor (e.g., the processor 610 of FIG. 6A) of an electronic device (e.g., the electronic device 100 of FIGS. 1A to 4 or the electronic device 600 of FIG. 6A) according to an embodiment of the present disclosure may detect the execution of the desktop extension mode. The desktop extension mode may be automatically executed when a communication connection with a docking device (e.g., the docking device 200 of FIGS. 1A to 4 or the docking device 501 of FIG. 5) to which an external display device (e.g., the external display device 300 of FIGS. 1A to 4) is connected or a communication connection with the external display device is detected. Alternatively, the desktop extension mode may be executed by a user's request (or selection) after the communication connection with the docking device to which the external display device is connected or the communication connection with the external display device is established.

In operation 903, the at least one processor according to an embodiment of the present disclosure may detect the execution of an application requesting an audio output. For example, the at least one processor may detect a reproduction request for a video content and/or an audio content (e.g., music) which is downloaded in real-time through a communication circuit (e.g., the communication circuit 640 of FIG. 6A) stored in a memory (e.g., the memory 620 of FIG. 6A).

In operation 905, the at least one processor according to an embodiment of the present disclosure may confirm whether a new audio output path is detected.

In operation 907, when the new audio output path is not detected on the basis of the confirmation result of operation 905, the at least one processor may control the audio path so that audio is output through a default output path. The default output path may be determined according to a priority policy configured among a speaker, an earphone, a Bluetooth earphone, or a Bluetooth speaker of the electronic device.

In operation 909, when the new audio output path is detected on the basis of the confirmation result of operation 905, the at least one processor according to an embodiment of the present disclosure may confirm whether there is a change history of the audio output path of the electronic device. For example, the at least one processor may confirm whether there is the change history of the audio output path by a user after the desktop extension mode is executed. The change history may include previously connected device information (e.g., the docking device, the external display device, or the external device), the number of selections, and/or preference.

In operation 911, when there is the change history of the audio output path on the basis of the confirmation result of operation 909, the at least one processor according to an embodiment of the present disclosure may adapt the audio output path on the basis of the change history. For example, the at least one processor may control the audio path so that audio is output through the speaker of the external display device selected immediately before. According to some embodiments, the at least one processor may compare the number of selections for a plurality of connected external devices and may control the audio path so that audio is output via the most frequently selected external device. According to another embodiment, the at least one processor may control the audio path so that audio is output through a device having the highest preference (priority) among the plurality of connected external devices.

In operation 913, when the change history of the audio output path does not exist on the basis of the confirmation result of operation 909, the at least one processor according to an embodiment of the present disclosure may provide data (e.g., the second data) corresponding to a user interface (e.g., the second user interface) that allows a user to change the audio output path, to the connected external display device. After the data is provided, the at least one processor according to an embodiment of the present disclosure may proceed to operation 815 of FIG. 8. Here, although not shown in FIG. 8, when the audio output path is changed in operation 815 and then the desktop extension mode is terminated, the at least one processor according to an embodiment of the present disclosure may store the changed audio output path in the change history.

FIG. 10 is a flowchart illustrating a procedure for controlling an audio path of an electronic device according to an event occurrence according to an embodiment of the present disclosure.

Referring to FIG. 10, in operation 1001, at least one processor (e.g., the processor 610 of FIG. 6A) of an electronic device (e.g., the electronic device 100 of FIGS. 1A to 4 or the electronic device 600 of FIG. 6A) according to an embodiment of the present disclosure may detect the extension of the desktop extension mode. The desktop extension mode may be automatically executed when a communication connection with a docking device (e.g., the docking device 200 of FIGS. 1A to 4 or the docking device 501 of FIG. 5) to which an external display device (e.g., the external display device 300 of FIGS. 1A to 4) is connected or a communication connection with the external display device is detected. Alternatively, the desktop extension mode may be executed by a user's request (or selection) after the communication connection with the docking device to which the external display device is connected or the communication connection with the external display device is established.

In operation 1003, the at least one processor according to an embodiment of the present disclosure may change an audio path to the external display device on the basis of the user's selection, and may store a default output path (the audio output path before the change). For example, the at least one processor may receive a user's selection for the audio path change through a user interface (e.g., the selection screen 35 capable of selecting the audio path of FIG. 4) that can select the audio path change.

In operation 1005, the at least one processor according to an embodiment of the present disclosure may output audio to the changed audio output path. For example, the at least one processor may output audio through the changed audio output path (e.g., a television) when the reproduction of a video or audio content is requested.

In operation 1007, the at least one processor according to an embodiment of the present disclosure may determine whether an event requesting the release of the desktop extension mode occurs. For example, the event may be an event that is released from the docking device to use a call reception or an authentication sensor (e.g., a fingerprint sensor or an iris sensor). By way of another example, the event may be an event that temporarily terminates the corresponding connection through a mode change (e.g., switched to a mirroring mode) in the desktop extension mode.

When the event does not occur on the basis of the determination result of operation 1007, the at least one processor according to an embodiment of the present disclosure may repeat an operation of maintaining operation 1005 and determining whether the event occurs. Alternatively, the at least one processor may determine whether the external display device is disconnected.

In operation 1009, when the event occurs on the basis of the determination result of operation 1007, the at least one processor according to an embodiment of the present disclosure may release the desktop extension mode. For example, the at least one processor may temporarily release (or suspend) the desktop extension mode.

In operation 1011, when the desktop extension mode is released, the at least one processor according to an embodiment of the present disclosure may store the changed audio output path (e.g., a television), may change the audio path to the stored default output path, and may store an event occurrence time.

In operation 1013, the at least one processor according to an embodiment of the present disclosure may determine whether the event is terminated. For example, the at least one processor may determine whether a call event is terminated.

When the event is not terminated on the basis of the determination result of operation 1013, the at least one processor according to an embodiment of the present disclosure may maintain operation 1013. On the other hand, in operation 1015, when the event is terminated on the basis of the determination result of operation 1013, the at least one processor according to an embodiment of the present disclosure may detect the re-execution of the desktop extension mode. For example, a user may reconnect the electronic device to the docking device or the external display device after the event is terminated.

In operation 1017, when the re-execution of the desktop extension mode is detected, the at least one processor according to an embodiment of the present disclosure may determine whether the desktop extension mode is re-executed within a designated time period (e.g., about 5 minutes) after the occurrence of the event. For example, the at least one processor may receive a call request and then may determine whether the desktop extension mode is re-executed within the designated time period.

In operation 1019, when the desktop extension mode is not re-executed within the designated time period on the basis of the determination result of operation 1017 (e.g., when the desktop extension mode is re-executed after exceeding the designated time period), the at least one processor according to an embodiment of the present disclosure may provide data (e.g., the second data) corresponding to a user interface (e.g., the second user interface) that allows a user to change the audio output path to the connected external display device. After the data is provided, the at least one processor according to an embodiment of the present disclosure may proceed to operation 815 of FIG. 8. According to an embodiment, the user interface (e.g., the second user interface) that allows the audio output path to be changed may be displayed when a display request for the user interface is generated (e.g., when the selection of the audio path setting button 34 is received).

In operation 1021, when the desktop extension mode is re-executed within the designated time period on the basis of the determination result of operation 1017, the at least one processor according to an embodiment of the present disclosure may restore the audio path to the stored audio path (e.g., a television). For example, when the at least one processor is reconnected to the same external display device (e.g., a television) within the designated time period (e.g., about 5 minutes) after receiving the call request, the at least one processor may control the audio path so that audio is output through the speaker of the external display device.

According to some embodiments, the at least one processor may control the audio path so that audio is output through the external display device when the at least one processor is reconnected to the external display device (e.g., a television) within a set time period (e.g., about one minute) from a call end time.

Meanwhile, in the above description, the audio output path is controlled in the desktop extension mode. However, various embodiments of the present disclosure may be applied to various modes (e.g., a mirroring mode) in which video and audio can be shared.

According to various embodiments of the present disclosure, a method of controlling an audio output path of an electronic device (e.g., the electronic device 100 of FIGS. 1 to 4, or the electronic device 600 of FIG. 6a), may comprise detecting that the electronic device is communicating with an external display device (e.g., the external display device 300 of FIGS. 1 to 4) through a communication circuit (e.g., the communication circuit 640 of FIG. 6a); providing first data for rendering a first user interface on the external display device through the communication circuit when it is detected that the electronic device is communicating with the external display device; providing second data configured to render a second user interface on the external display device through the communication circuit, wherein the second user interface allows a user to select one of the electronic device and the external display device for providing audio that is generated from or relayed through the electronic device; receiving a selection of one of the electronic device and the external display device through the communication circuit or a touch screen display (e.g., the touch screen display 630 of FIG. 6a) included in the electronic device; and adapting the audio output path of the electronic device so that audio is provided on the basis of selection when the selection is received.

According to various embodiments, the method may further comprises providing audio through one of a speaker, an earphone, and another external device including a speaker by default after detecting that the electronic device is communicating with the external display device.

According to various embodiments, the providing of the second data to the external display device may include providing the second data configured to render a button on at least a portion of the external display device, and displaying the second user interface on the external display device when receiving the user input. The user input is received by selecting the button through the communication circuit or the touch screen display According to various embodiments, the providing of the second data to the external display device may include determining, by the external display device, whether an output of audio is possible, and responsive to determining, providing the second data to the external display device.

According to various embodiments, the external display device and the electronic device may be connected through a docking device.

According to various embodiments, the method may further comprises determining whether a communication connection with the external display device is disconnected, and outputting audio through a default output path of the electronic device in response to the disconnection of the communication connection.

According to various embodiments, wherein the adapting of the audio output path of the electronic device includes automatically changing the audio output path so that audio is output through the external display device, when a change history of the audio output path to the external display device exists.

According to various embodiments, the method may further comprises storing a change history of the adapted audio output path in response to the detection of the communication disconnection.

According to various embodiments, the method may further comprises detecting occurrence of a designated desktop extension mode release event while audio is output through the external display device, changing the audio output path so that audio is output through a default output path of the electronic device in response to the occurrence of the desktop extension mode release event, and re-changing the audio output path so that audio is output through the external display device when the electronic device is reconnected to the external display device within a designated time period after the desktop extension mode release event is terminated.

Figure 11:
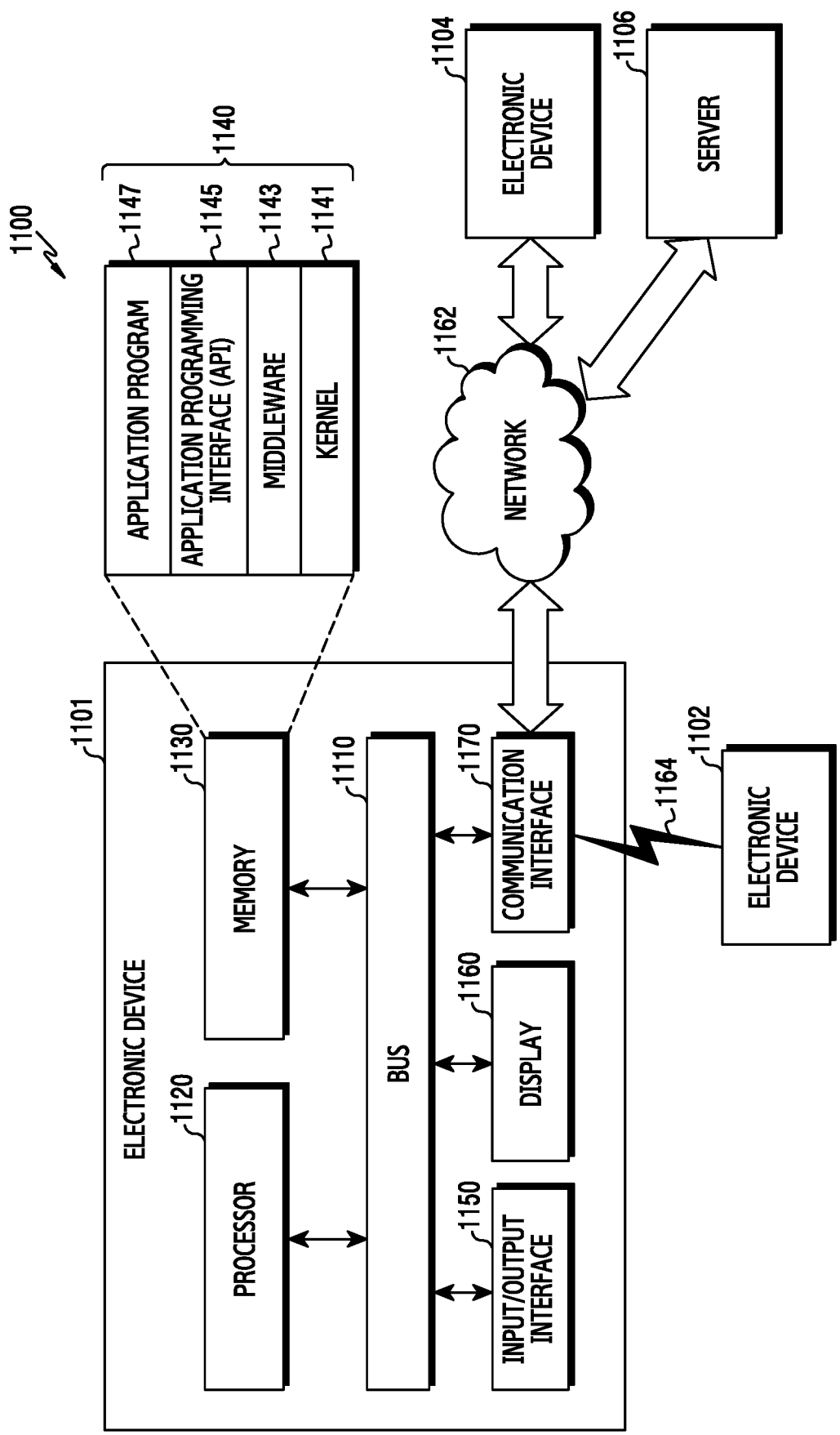
FIG. 11 illustrates a network environment including an electronic device according to various embodiments of the present disclosure.

FIG. 11 is a block diagram of an electronic device in a system (1100), according to an embodiment of the present disclosure.

Referring initially to FIG. 11, electronic devices 1101, 1102, 1104 and/or a server 1106 may be connected to each other via a network 1162 and/or a wireless (e.g., short-range) communication 1164. The electronic device 1101 (e.g., the electronic device 100 of FIGS. 1 to 4, or the electronic device 600 of FIG. 6a) includes a bus 1110, a processor (e.g., including processing circuitry) 1120, a memory 1130, an input/output interface (e.g., including input/output circuitry) 1150, a display 1160, and a communication interface (e.g., including communication circuitry) 1170. The electronic device 1101 may be provided without at least one of the components, or may include at least one additional component.

Electronic device 1102 may correspond to docking device 200, external display device 300, and/or external device 400.

The bus 1110 may include a circuit for connecting the components 1120 through 1170 and delivering communication signals (e.g., control messages or data) therebetween.

The processor 1120 (e.g., the processor 610 of FIG. 6a) may include various processing circuitry, such as, for example, and without limitation one or more of a dedicated processor, a CPU, an AP, and a communication processor (CP). The processor 1120, for example, may perform an operation or data processing with respect to control and/or communication of at least another component of the electronic device 1101.

The memory 1130 (e.g., the memory 620 of FIG. 6a) may include a volatile and/or nonvolatile memory. The memory 1130, for example, may store commands or data relating to at least another component of the electronic device 1101. According to an embodiment of the present disclosure, the memory 1130 may store software and/or a program 1140. The program 1140 includes, for example, a kernel 1141, middleware 1143, an application programming interface (API) 1145, and/or an application program (or applications) 1147. At least part of the kernel 1141, the middleware 1143, or the API 1145 may be referred to as an operating system (OS). The kernel 1141 may control or manage system resources (e.g., the bus 1110, the processor 1120, or the memory 1130) used for performing operations or functions implemented by the other programs (e.g., the middleware 1143, the API 1145, or the applications 1147). Additionally, the kernel 1141 may provide an interface for controlling or managing system resources by accessing an individual component of the electronic device 1101 from the middleware 1143, the API 1145, or the applications 1147.

The middleware 1143, for example, may serve an intermediary role for exchanging data between the API 1145 or the applications 1147 and the kernel 1141 through communication. Additionally, the middleware 1143 may process one or more job requests received from the applications 1147, based on their priority. The middleware 1143 may assign a priority for using a system resource (e.g., the bus 1110, the processor 1120, or the memory 1130) of the electronic device 1101 to at least one of the applications 1147, and process the one or more job requests. The API 1145, as an interface through which the applications 1147 controls a function provided from the kernel 1141 or the middleware 1143, may include, for example, at least one interface or function (e.g., an instruction) for file control, window control, image processing, or character control. The input/output interface 1150, for example, may deliver commands or data input from a user or another external device to other component(s) of the electronic device 1101, or output commands or data input from the other component(s) of the electronic device 1101 to the user or another external device.

The display 1160 (e.g., the touch screen display 630 of FIG. 6a), for example, may include a liquid crystal display (LCD), a light emitting diode (LED) display, an organic light emitting diode (OLED) display, a microelectromechanical systems (MEMS) display, or an electronic paper display, and the like, but is not limited thereto. The display 1160, for example, may display various content (e.g., texts, images, videos, icons, and/or symbols) to the user. The display 1160 may include a touch screen, for example, and receive touch, gesture, proximity, or hovering inputs by using an electronic pen or a user's body part.

The communication interface 1170 (e.g., the communication circuit 640 of FIG. 6a) may include various communication circuitry and, for example, may set communications between the electronic device 1101 and an external device (e.g., a first external electronic device 1102, a second external electronic device 1104, or a server 1106. The communication interface 1170 may communicate with the second external electronic device 1104 or the server 1106 over a network 1162 through wireless communication or wired communication. The communication interface 1170 may additionally communicate with the first external electronic device 1102 using a short-range wireless communication connection 1164.

The wireless communication, for example, may include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication may include, for example, as shown by an element 1164 of FIG. 11, at least one of wireless fidelity (Wi-Fi), light fidelity (Li-Fi), Bluetooth™, Bluetooth™ low energy (BLE), Zigbee, near field communication (NFC), magnetic secure transmission, radio frequency (RF), and body area network (BAN). The wireless communication may include GNSS. The GNSS may include, for example, global positioning system (GPS), global navigation satellite system (GLONASS), Beidou navigation satellite system (Beidou), or Galileo (the European global satellite-based navigation system). Hereafter, the term GPS may be interchangeably used with the term GNSS. The wired communication, for example, may include at least one of universal serial bus (USB), high definition multimedia interface (HDMI), recommended standard 232 (RS-232), power line communications, and plain old telephone service (POTS). The network 1162 may include a telecommunications network, for example, at least one of a computer network (e.g., LAN or WAN), the Internet, and a telephone network.

In certain embodiments, communication interface 1170 may providing the first data and the second data to the external display device, and receive selection of one of the electronic device or external display device.

Each of the first and second external electronic devices 1102 and 1104 may be of the same type or of a different type from that of the electronic device 1101. According to an embodiment of the present disclosure, all or part of operations executed in the electronic device 1101 may be executed by another electronic device or a plurality of electronic devices (e.g., the electronic device 1102 or 1104, or the server 1106). To perform a function or service automatically or by request, instead of performing the function or the service by the electronic device 1101, the electronic device 1101 may request at least part of a function relating thereto from the electronic device 1102 or 1104, or the server 1106. The electronic device 1102 or 1104, or the server 1106 may perform the requested function or an additional function and send its result to the electronic device 1101. The electronic device 1101 may provide the requested function or service by processing the received result. In doing so, for example, cloud computing, distributed computing, or client-server computing techniques may be used.

Figure 12:
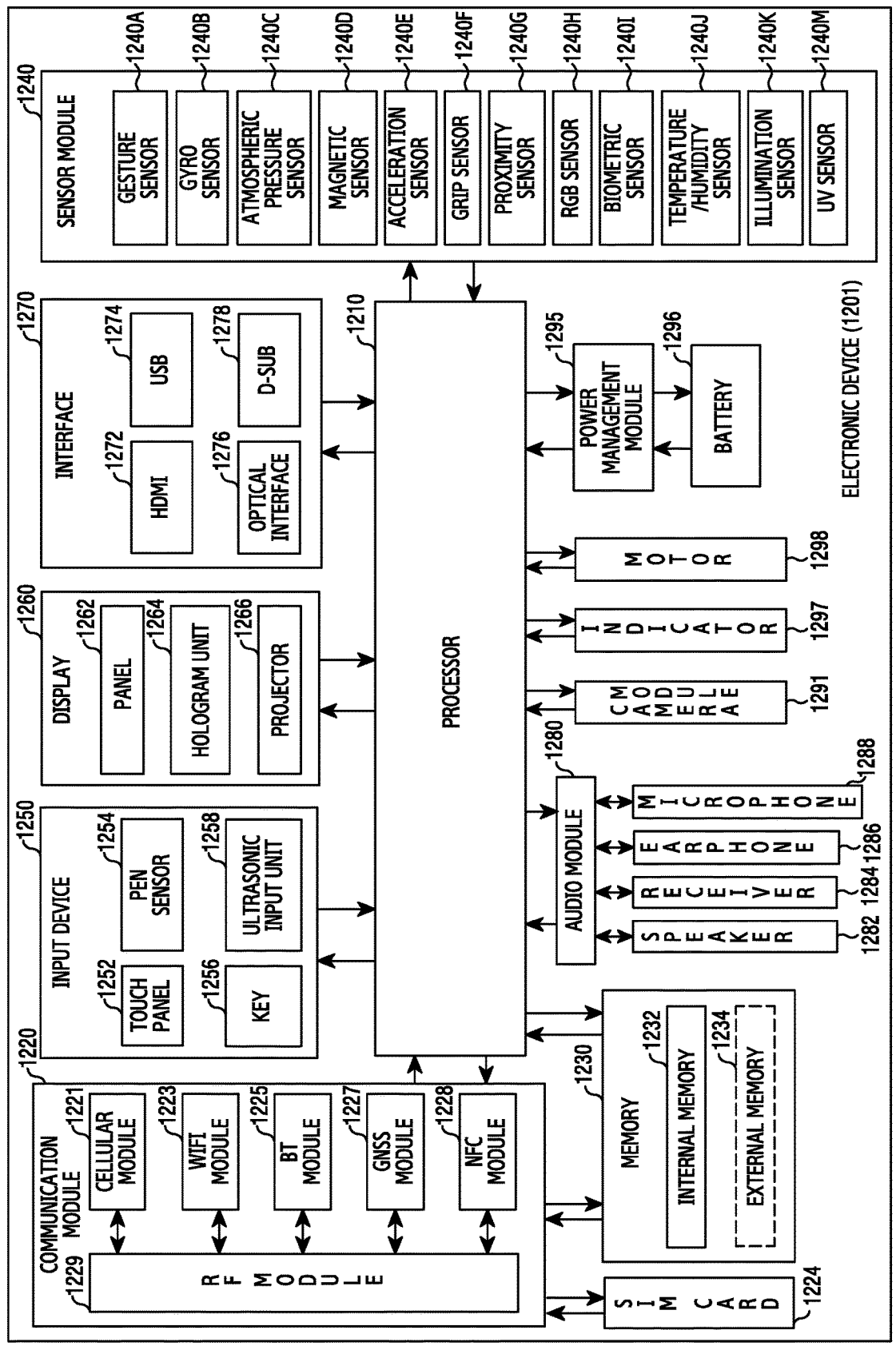
FIG. 12 is a block diagram illustrating an electronic device according to various embodiments.

FIG. 12 is a block diagram of an electronic device, according to an embodiment of the present disclosure.

The electronic device 1201, for example, may include all or part of the above-described electronic device 100 of FIGS. 1 to 4, electronic device 600 of FIG. 6a, or electronic device 1101 of FIG. 11. The electronic device 1201 includes one or more processors (e.g., an AP) 1210, a communication module 1220, a subscriber identification module (SIM) 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 (e.g., the processor 610 of FIG. 6a, or the processor 1120 of FIG. 11), for example, may include various processing circuitry and may control a plurality of hardware or software components connected to the processor 1210, and also may perform various data processing and operations by executing an OS or an application program.

The processor 1210 may be implemented with a system on chip (SoC), for example. The processor 1210 may further include a graphic processing unit (GPU) and/or an image signal processor. The processor 1210 may include at least part (e.g., a cellular module 1221) of the components illustrated in FIG. 12. The processor 1210 may load commands or data received from at least one other component (e.g., a nonvolatile memory) into a volatile memory, process the commands, and store various data in the nonvolatile memory. In certain embodiments, the processor(s) 1210 execute instructions causing the processor 1210 to perform the operations described FIGS. 7-10.

The communication module 1220 may have the same or similar configuration as the communication circuit 640 of FIG. 6a or the communication interface 1170 of FIG. 11. The communication module 1220 may include various communication circuitry, such as, the cellular module 1221, a Wi-Fi module 1223, a Bluetooth™ (BT) module 1225, a GNSS module 1227, an NFC module 1228, and an RF module 1229. The cellular module 1221, for example, may provide voice call, video call, short message service (SMS), or Internet service through a communication network. The cellular module 1221 may identify and authenticate the electronic device 1201 in a communication network by using the SIM 1224. The cellular module 1221 may perform at least part of a function that the processor 1210 provides. The cellular module 1221 may further include a CP. At least some (e.g., two or more) of the cellular module 1221, the Wi-Fi module 1223, the BT module 1225, the GNSS module 1227, and the NFC module 1228 may be included in one integrated circuit (IC) or an IC package. The RF module 1229, for example, may transmit/receive a communication signal (e.g., an RF signal). The RF module 1229, for example, may include a transceiver, a power amp module (PAM), a frequency filter, a low noise amplifier (LNA), or an antenna. At least one of the cellular module 1221, the Wi-Fi module 1223, the BT module 1225, the GNSS module 1227, and the NFC module 1228 may transmit/receive an RF signal through an additional RF module.

In certain embodiments, the communication module 1220 can provide the first data configured to render a first user interface on the external display device when it is detected that the electronic device is communicating with the external display device, and provide second data configured to render a second user interface on the external display device, wherein the second user interface allows a user to select one of the electronic device and the external display device for providing audio generated from or relayed through the electronic device.

The SIM 1224, for example, may include a card or an embedded SIM, and also may contain unique identification information (e.g., an integrated circuit card identifier (IC-CID)) or subscriber information (e.g., an international mobile subscriber identity (IMSI)).

The memory 1230 (e.g., the memory 620 of FIG. 6a, or the memory 1130 of FIG. 11) may include at least one of an internal memory 1232 or an external memory 1234. The internal memory 1232 may include at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, hard drive, and solid state drive (SSD)). The external memory 1234 may include flash drive, for example, compact flash (CF), secure digital (SD), micro SD, mini SD, extreme digital (xD), multi-media card (MMC), or memory stick. The external memory 1234 may be functionally or physically connected to the electronic device 1201 through various interfaces.

The sensor module 1240 may, for example, measure physical quantities or detect an operating state of the electronic device 1201, and convert the measured or detected information into electrical signals. The sensor module 1240 includes at least one of a gesture sensor 1240A, a gyro sensor 1240B, an atmospheric pressure sensor 1240C, a magnetic sensor 1240D, an acceleration sensor 1240E, a grip sensor 1240F, a proximity sensor 1240G, a color sensor 1240H (e.g., a red, green, blue (RGB) sensor). The sensor module 1240 may also include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling at least one sensor therein. The electronic device, as part of the processor 1210 or individually, may further include a processor configured to control the sensor module 1240 and control the sensor module 1240 while the processor 1210 is sleeping.

The input device 1250 may include various input circuitry including at least one of a touch panel 1252, a (digital) pen sensor 1254, a key 1256, and an ultrasonic input device 1258. The touch panel 1252 may use at least one of, for example, capacitive, resistive, infrared, and ultrasonic methods. Additionally, the touch panel 1252 may further include a control circuit. The touch panel 1252 may further include a tactile layer to provide a tactile response to a user. The (digital) pen sensor 1254 may include, for example, part of a touch panel or a sheet for recognition. The key 1256 may include, for example, a physical button, a touch key, an optical key, or a keypad. The ultrasonic input device 1258 may detect ultrasonic waves from a microphone 1288 and check data corresponding to the detected ultrasonic waves.

The display 1260 (e.g., the touch screen display 630 of FIG. 6a, or the display 1160) may include at least one of a panel 1262, a hologram device 1264, a projector 1266, and/or a control circuit for controlling them. The panel 262 may be flexible, transparent, or wearable, for example. The panel 1262 and the touch panel 1252 may be configured with one or more modules. The panel 1262 may include a pressure sensor (or a force sensor) for measuring a pressure of the user touch. The pressure sensor may be integrated with the touch panel 1252, or include one or more sensors separately from the touch panel 1252. The hologram device 1264 may show three-dimensional images in the air by using the interference of light. The projector 1266 may display an image by projecting light on a screen. The screen, for example, may be placed inside or outside the electronic device 1201.

The interface 1270 includes various interface circuitry, such as an HDMI 1272, a USB 1274, an optical interface 1276, or a D-subminiature (D-sub) 1278. The interface 1270 may be included in, for example, the interface 650 of FIG. 6a, or the communication interface 1170 of FIG. 11. Additionally or alternately, the interface 1270 may include a mobile high-definition link (MHL) interface, a SD card/MMC interface, or an infrared data association (IrDA) standard interface.

The audio module 1280, for example, may convert sounds into electrical signals and convert electrical signals into sounds. At least some components of the audio module 1280 may be included in, for example the input/output interface 1150 of FIG. 11. The audio module 1280 may process sound information input or output through a speaker 1282, a receiver 1284, an earphone 1286, or the microphone 1288. Depending on the audio output path, the earphone 1286 or the speaker 1282 can output audio data. The camera module 1291, as a device for capturing still images and videos, may include one or more image sensors (e.g., a front sensor or a rear sensor), a lens, an image signal processor (ISP), or a flash (e.g., an LED or a xenon lamp). The power management module 1295, for example, may manage the power of the electronic device 1201. According to an embodiment of the present disclosure, the power management module 1295 may include a power management IC (PMIC), a charger IC, or a battery gauge, for example. The PMIC may have a wired and/or wireless charging method. The wireless charging method may include, for example, a magnetic resonance method, a magnetic induction method, or an electromagnetic method, and may further include an additional circuit for wireless charging, for example, a coil loop, a resonant circuit, or a rectifier circuit. The battery gauge may measure the remaining charge capacity of the battery 1296, or a voltage, current, or temperature of the battery 1296 during charging. The battery 1296 may include, for example, a rechargeable battery and/or a solar battery.

The indicator 1297 may display a specific state of the electronic device 1201 or part thereof (e.g., the processor 1210), for example, a booting state, a message state, or a charging state. The motor 1298 may convert electrical signals into a mechanical vibration and generate a vibration or haptic effect. The electronic device 1201 may include a mobile TV supporting device (e.g., a GPU) for processing media data according to standards such as digital multimedia broadcasting (DMB), digital video broadcasting (DVB), or MediaFlo™. Each of the above-described components of the electronic device may be configured with at least one component and the name of a corresponding component may vary according to the kind of electronic device. According to an embodiment of the present disclosure, the electronic device 1201 may be configured to include at least one of the above-described components or an additional component, or to not include some of the above-described components. Additionally, some of components in an electronic device are configured as one entity, so that functions of previous corresponding components are performed identically.

Figure 13:
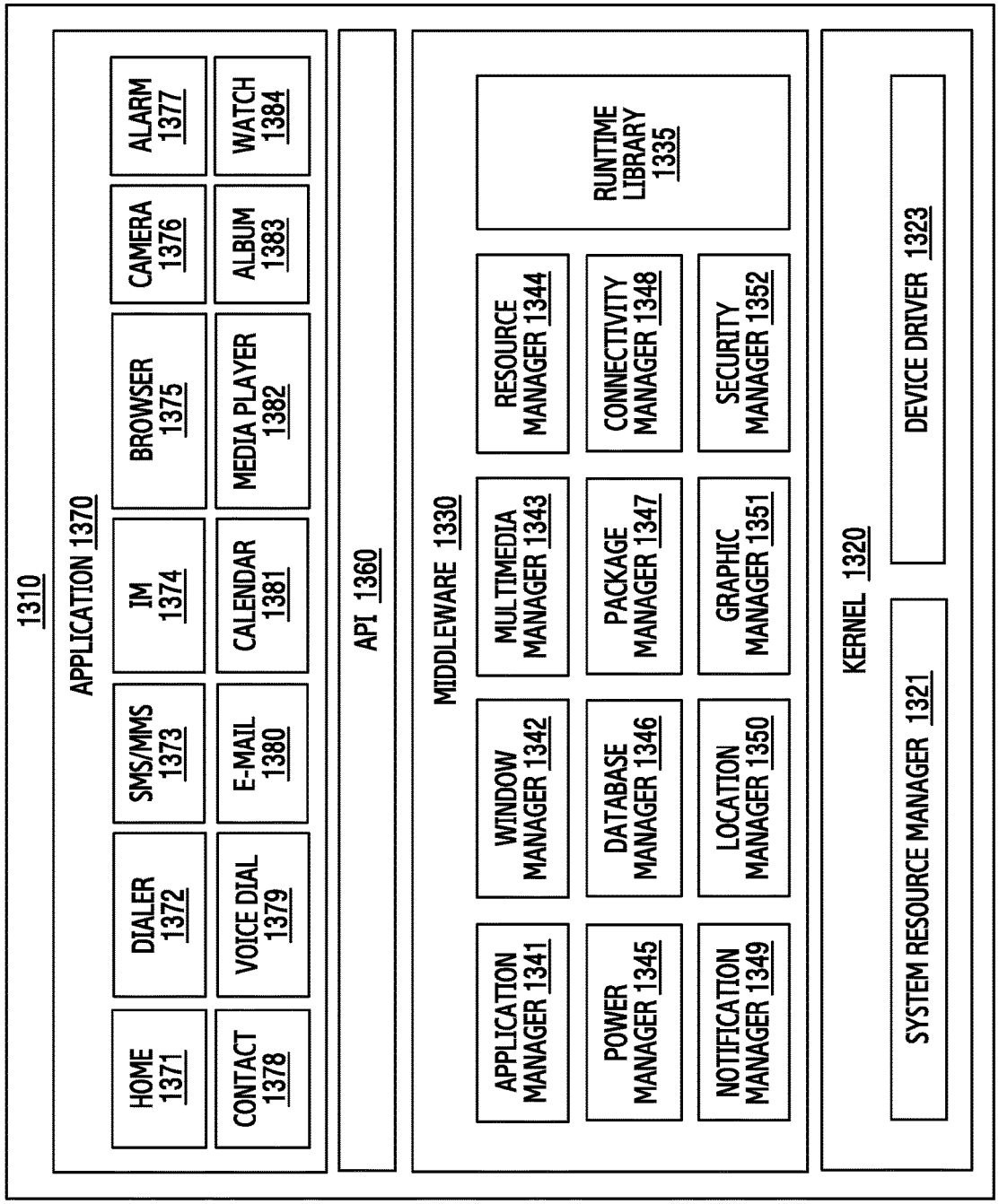
FIG. 13 is a block diagram illustrating a program module according to various embodiments.

FIG. 13 is a block diagram of a program module, according to an embodiment of the present disclosure.

A program module 1310 (e.g., the program 1140 of FIG. 11) may include an OS for controlling a resource relating to the electronic device 1101 and/or the applications 1147 running on the OS. The OS may include, for example, Android™, iOS™, Windows™, Symbian™, Tizen™, or Bala™. Referring to FIG. 13, the program module 1310 includes a kernel 1320 (e.g., the kernel 1141), a middleware 1330 (e.g., the middleware 1143), an API 1360 (e.g., the API 1145), and/or an application 1370 (e.g., the applications 1147). At least part of the program module 1310 may be preloaded on an electronic device or may be downloaded from an external electronic device (e.g., the first external electronic device 1102, the second external electronic device 1104, or the server 1106).

The kernel 1320 includes, for example, at least one of a system resource manager 1321 and/or a device driver 1323. The system resource manager 1321 may control, allocate, or retrieve a system resource. According to an embodiment of the present disclosure, the system resource manager 1321 may include a process management unit, a memory management unit, or a file system management unit. The device driver 1323 may include, for example, a display driver, a camera driver, a Bluetooth™ driver, a shared memory driver, a USB driver, a keypad driver, a Wi-Fi driver, an audio driver, or an inter-process communication (IPC) driver.

The middleware 1330, for example, may provide a function commonly required by the application 1370, or may provide various functions to the application 1370 through the API 1360 in order to allow the application 1370 to efficiently use a limited system resource inside the electronic device. The middleware 1330 includes at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, and a security manager 1352.

The runtime library 1335 may include, for example, a library module used by a compiler to add a new function through a programming language while the application 1370 is running. The runtime library 1335 may manage input/output, manage memory, or arithmetic function processing. The application manager 1341, for example, may manage the life cycle of the applications 1370. The window manager 1342 may manage a GUI resource used in a screen. The multimedia manager 1343 may recognize a format for playing various media files and encode or decode a media file by using the codec in a corresponding format. The resource manager 1344 may manage a source code of the application 1140 or a memory space. The power manager 1345 may manage the capacity, temperature, and/or power of the battery, and determine or provide power information for an operation of the electronic device using corresponding information among the capacity, temperature, and/or power of the battery. The power manager 1345 may operate together with a basic input/output system (BIOS). The database manager 1346 may create, search, or modify a database used in the application 1370. The package manager 1347 may manage installation or updating of an application distributed in a package file format.

The connectivity manager 1348 may manage, for example, a wireless connection. The notification manager 1349 may provide an event, such as incoming messages, appointments, and proximity alerts, to the user. The location manager 1350 may manage location information of an electronic device. The graphic manager 1351 may manage a graphic effect to be provided to the user or a user interface relating thereto. The security manager 1352 may provide, for example, system security or user authentication. The middleware 1330 may include a telephony manager for managing a voice or video call function of the electronic device, or a middleware module for combining various functions of the above-described components. The middleware 1330 may provide a module specialized for each type of OS. The middleware 1330 may dynamically delete part of the existing components or add new components. The API 1360, as a set of API programming functions, may be provided as another configuration according to the OS. For example, Android or iOS may provide one API set for each platform, and Tizen may provide two or more API sets for each platform.

The application 1370 includes at least one of a home 1371, a dialer 1372, an SMS/multimedia messaging system (MMS) 1373, an instant message (IM) 1374, a browser 1375, a camera 1376, an alarm 1377, a contact 1378, a voice dial 1379, an e-mail 1380, a calendar 1381, a media player 1382, an album 1383, a clock 1384. Additionally, the application 1370 may include health care (e.g., measure an exercise amount or blood sugar level), or environmental information (e.g., air pressure, humidity, or temperature information) application. The application 1370 may include an information exchange application for supporting information exchange between the electronic device and an external electronic device. The information exchange application may include, for example, a notification relay application for relaying specific information to the external device or a device management application for managing the external electronic device. The notification relay application may relay notification information from another application of the electronic device to an external electronic device, or receive and forward notification information from an external electronic device to the user. The device management application, for example, may install, delete, or update a function (e.g., turn-on/turn off of the external electronic device itself (or some components) or display brightness (or resolution) adjustment) of an external electronic device communicating with the electronic device, or an application operating in the external electronic device. The application 1370 may include a specific application (e.g., a health care application of a mobile medical device) according to a property of the external electronic device. The application 1370 may include an application received from an external electronic device. At least part of the program module 1310 may be implemented (e.g., executed) with software, firmware, hardware (e.g., the processor 1210), or a combination of at least two of them, and include a module, a program, a routine, a set of instructions, or a process for executing one or more functions.

Various embodiments of the present disclosure may provide a user interface that allows a user to select one of paths (devices) capable of performing an audio output while maintaining the audio path of the electronic device at the time of the connection between the electronic device and the external device.

In addition, various embodiments of the present disclosure may automatically change the audio output path on the basis of the audio path change history of the electronic device when the audio output is requested in a state where the electronic device and the external device are connected to each other, thereby improving the convenience of a user.

As used herein, the term "module" may include a unit implemented in hardware, or hardware programmed with software, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1232 or external memory 1234) that is readable by a machine (e.g., the electronic device 100, 600, 1101, 1201). For example, a processor (e.g., the processor 610, 1120, 1210) of the machine (e.g., the electronic device 100, 600, 1101, 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. An electronic device comprising:
a housing;
a touch screen display disposed at a surface of the housing;
at least one wireless or wired communication circuit located inside the housing;
a speaker exposed through the housing;
at least one processor positioned inside the housing and operatively connected to the display, the communication circuit, and the speaker; and
a memory positioned inside the housing and operatively connected to the processor, wherein the memory stores instructions that, when executed, cause the at least one processor to:
detect whether an external display device is connected to the electronic device through the communication circuit while the electronic device is outputting audio using a default output path, execute an extension mode and provide first data configured to render a first user interface on the external display device through the communication circuit responsive to detecting that the external display device is connected to the display device, wherein the default output path is maintained, determine whether the external display device can output audio, in response that the external display device can output audio, provide second data configured to render a second user interface on the external display device through the communication circuit, wherein the second user interface allows a user to select one of the electronic device or the external display device for providing audio generated from or relayed through the electronic device, receive a selection of one of the electronic device or the external display device through the communication circuit or the touch screen display, wherein the selection is detected on the second user interface rendered on the external display device or the touch screen display, and responsive to receiving the selection, adapt an audio output path of the electronic device to provide the audio on the basis of the selection.

2. The electronic device of claim 1, wherein the instructions cause the at least one processor to provide the audio through the speaker as the default output path.

3. The electronic device of claim 1, further comprising:
an audio interface to which an earphone is connected,
wherein the instructions cause the at least one processor to provide the audio through the audio interface as the default output path.

4. The electronic device of claim 1, wherein the instructions cause the at least one processor to provide the audio to another external device including a speaker through the communication circuit as the default output path.

5. The electronic device of claim 1, wherein the instructions cause the at least one processor to:
render a button on at least a portion of the external display device,
receive a user input selecting the button through the communication circuit or the touch screen display, and
display the second user interface on the external display device responsive to receiving the user input.

6. The electronic device of claim 1, wherein the instructions cause the at least one processor to:
receive an indication from the external display device indicating that an output of audio is possible via the communication circuit, and
provide the second data to the external display device responsive to receiving the indication that the output of audio is possible.

7. The electronic device of claim 1, wherein the external display device and the electronic device are connected through a docking device.

8. The electronic device of claim 1, wherein the instructions cause the at least one processor to:
detect whether the connection is disconnected after changing the audio output path to the external display device, and
output the audio through the default output path of the electronic device in response to the communication disconnection being disconnected.

9. The electronic device of claim 1, wherein the instructions cause the at least one processor to automatically change the audio output path so that the audio is output through the external display device, in response that a change history of the audio output path to the external display device exists.

10. The electronic device of claim 1, wherein the instructions cause the at least one processor to store a change history of the adapted audio output path in response to the connection being disconnected.

11. The electronic device of claim 1, wherein the instructions cause the at least one processor to:
change the audio output path so that the audio is provided to the default output path of the electronic device in response that occurrence of a call event is detected while the audio is provided to the external display device, and
change the audio output path to the external display device in response that a reconnection of the external display device is detected within a designated time period after the call event is terminated.

12. A method of controlling an audio output path of an electronic device, comprising:
detecting whether an external display device is connected to the electronic device through a communication circuit while the electronic device is outputting audio using a default output path;
executing an extension mode and providing first data configured to render a first user interface on the external display device through the communication circuit responsive to detecting that the external display device is connected to the display device, wherein the default output path is maintained;
providing second data configured to render a second user interface on the external display device through the communication circuit, wherein the second user interface allows a user to select one of the electronic device or the external display device for providing audio generated from or relayed through the electronic device;
receiving a selection of one of the electronic device or the external display device through the communication circuit or a touch screen display included in the electronic device, wherein the selection is detected on the second user interface rendered on the external display device or the touch screen display; and
responsive to receiving the selection, adapting the audio output path of the electronic device to provide the audio on the basis of selection.

13. The method of controlling the audio output path of the electronic device of claim 12, wherein outputting the audio using the default output path comprises:
providing the audio through one of a speaker, an earphone, and another external device including a speaker as the default output path.

14. The method of controlling the audio output path of the electronic device of claim 12, wherein the providing the second data to the external display device comprises:
render a button on at least a portion of the external display device;
receiving a user input selecting the button through the communication circuit or the touch screen display; and
displaying the second user interface on the external display device responsive to receiving the user input.

15. The method of controlling the audio output path of the electronic device of claim 12, wherein the method further comprises:

determining that an output of audio is possible using the external display device; and responsive to determining, providing the second data to the external display device in response that the output of audio is possible.

16. The method of controlling the audio output path of the electronic device of claim 12, wherein the external display device and the electronic device are connected through a docking device.

17. The method of controlling the audio output path of the electronic device of claim 12, further comprising:

determining whether the connection is disconnected after changing the audio output path to the external display device; and outputting the audio through the default output path of the electronic device in response to the connection being disconnected.

18. The method of controlling the audio output path of the electronic device of claim 12, wherein the adapting of the audio output path of the electronic device comprises:

automatically changing the audio output path so that the audio is output through the external display device, in response that a change history of the audio output path to the external display device exists.

19. The method of controlling the audio output path of the electronic device of claim 12, further comprising:

storing a change history of the adapted audio output path in response to the connection is disconnected.

20. The method of controlling the audio output path of the electronic device of claim 12, further comprising:

detecting occurrence of a designated desktop extension mode release event while audio is output through the external display device;

changing the audio output path so that the audio is output through the default output path of the electronic device in response to the occurrence of the desktop extension mode release event; and re-changing the audio output path so that the audio is output through the external display device in response that the electronic device is reconnected to the external display device within a designated time period after the desktop extension mode release event is terminated.

* * * * *